United States Patent Office 3,400,119
Patented Sept. 3, 1968

3,400,119
NOVEL 4,1-BENZOTHIAZEPIN-2 (1H)-ONES AND
4,1-BENZOTHIAZEPINES
Wilhelm Wenner, Upper Montclair, and Milan Radoje
Uskokovic, Montclair, N.J., assignors to Hoffmann-La
Roche Inc., Nutley, N.J., a corporation of New Jersey
No Drawing. Continuation-in-part of application Ser. No.
445,264, Apr. 2, 1965. This application Mar. 21, 1966,
Ser. No. 535,722
22 Claims. (Cl. 260—239.3)

This application is a continuation-in-part of United States patent application Ser. No. 445,264, filed Apr. 2, 1965, now abandoned, which, in turn, is a continuation-in-part of United States patent application Ser. No. 266,030, filed Mar. 18, 1963, and now abandoned.

This invention relates to novel compounds having a heterocyclic ring structure containing nitrogen and sulfur as the hetero atoms, to a method for producing such compounds, and to novel intermediates useful in making the said heterocyclic ring compounds.

More particularly, the present invention relates to novel benzothiazepines and benzothiazocines, to a method for producing such compounds, and to novel intermediates useful in making such benzothiazepines and benzothiazocines.

Still more particularly, the present invention in one aspect, relates to novel 4,1-benzothiazepines and novel 5,1-benzothiazocines, either unsubstituted in position-1 or having a lower alkyl group joined thereto thereat, to a novel process for the preparation thereof and to novel intermediates useful in the preparation of such compounds.

In another particular aspect, the invention relates to novel 4,1-benzothiazepines and 5,1 benzothiazocines having a basic side chain in the 1-position, to novel procedures for preparing same and to novel intermediates useful in such preparative procedures and to the use to which such basic side chain containing compounds can be put.

The 4,1-benzothiazepines and 5,1-benzothiazocines either unsubstituted or having a lower alkyl group in position-1 can be represented by the following structural formula

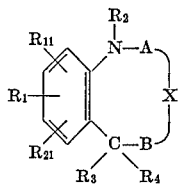

I wherein X is selected from the group consisting of

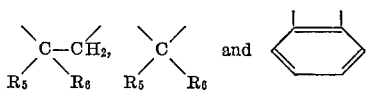

$R_1$, $R_{11}$ and $R_{21}$ each represent hydrogen, halogen, lower alkyl and lower alkoxy; $R_2$ and $R_3$ each represent hydrogen and lower alkyl; $R_4$ represents hydrogen, lower alkyl or a

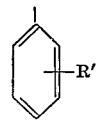

group wherein R' is selected from the group consisting of hydrogen and halogen; A represents a carbonyl

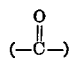

or a methylene group (—CH$_2$—); B represents a thio, a sulfinyl or a sulfonyl group; $R_5$ represents hydrogen, phenyl, lower alkyl or carboxy lower alkyl; and $R_6$ represents hydrogen, lower alkyl or lower alkanoyloxy. In an advantageous aspect, $R_6$, $R_{11}$ and $R_{21}$ all represent hydrogen and $R_5$ is selected from the group consisting of hydrogen and lower alkyl.

The lower alkyl groups represented by the symbols R in the above formula include both straight and branched chain groups such as methyl, ethyl, propyl and isopropyl. The term halogen, as used throughout the disclosure, is intended to connote all four halogens, namely, chlorine, bromine, iodine and fluorine unless otherwise specified. The expression lower alkoxy connotes a straight or branched chain hydrocarbonoxy group such as methoxy, ethoxy, isopropyloxy and the like. Lower alkanoyl as used herein represents the acyl residue of a lower alkanoic acid such as acetyl, propionyl and the like.

Compounds corresponding to Formula I above wherein A is methylene are basic and thus form acid addition salts by means of the treatment thereof with pharmaceutically acceptable inorganic or organic acids. Among the acids suitable for the salt-forming purpose are included such acids as mineral acids, e.g. hydrohalic acids such as hydrochloric, hydrobromic and the like, nitric acid, sulfuric acid, phosphoric acid, etc. and organic acids such as methane-sulfonic acid, succinic acid and maleic acid.

In one aspect of the invention, compounds corresponding to Formula I above are prepared by reacting a 2-nitrobenzyl halide which may be, for example, an α-unsubstituted 2-nitrobenzyl halide, an α-mono-lower alkyl-2-nitrobenzyl halide or an α-α-di-lower alkyl-2-nitrobenzyl halide and ring substituted derivatives of such halides, with preferably an α- or a β-mercapto acid thereby forming a 2-nitrobenzyl mercapto acid (see Formula III, infra). The resultant 2-nitrobenzyl mercapto acid is reduced, e.g. hydrogenated, to produce a mixture of a 2-aminobenzyl mercapto acid and a cyclic compound corresponding to Formula I above wherein B is thio, A is carbonyl and $R_6$ is hydrogen or lower alkyl, most preferably, hydrogen. This mixture is then subjected to dehydrating conditions thereby causing the cyclization of the 2-aminobenzyl mercapto acid in the mixture. Thus, this step results in a further yield of compounds corresponding to Formula I above wherein B is thio, A is carbonyl and $R_6$ is hydrogen or lower alkyl, preferably, hydrogen. The cyclized compound is then either (1) treated with hydrogen peroxide whereby to yield a compound wherein B of the Formula I above is sulfonyl and A is carbonyl or (2) treated with lithium aluminum hydride whereby A in Formula I above is methylene and B is thio or (3) treated with sodium periodate whereby to yield a compound corresponding to Formula I above wherein B is sulfinyl and A is carbonyl.

Advantageously, B in Formula I above is thio, A is methylene and X is

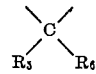

and $R_{11}$ and $R_{21}$ are both hydrogen. Thus, the invention relates, in a preferred embodiment, to a compound of the formula

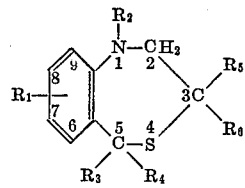

II wherein $R_1$ is selected from the group consisting of hydrogen, halogen, lower alkyl and lower alkoxy; $R_2$ and $R_3$ are each selected from the group consisting of hydrogen and lower alkyl; $R_4$ is selected from the group consisting of hydrogen, lower alkyl and

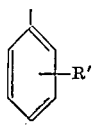

wherein R' is selected from the group consisting of hydrogen and halogen; $R_5$ is selected from the group consisting of hydrogen, phenyl, lower alkyl and carboxy lower alkyl; and $R_6$ is selected from the group consisting of hydrogen, lower alkyl and lower alkanoyloxy. More preferably, $R_3$, $R_4$, $R_5$ and $R_6$ in Formula II above are each selected from the group consisting of hydrogen and lower alkyl. Still more preferably, $R_3$, $R_4$ and $R_6$ are all hydrogen.

Certain of the processes described above are illustrated graphically in the following diagrammatical flow sheet wherein the symbols $R_1$, $R_3$ and $R_4$ have the meanings ascribed thereto hereinabove and Z is selected from the group consisting of

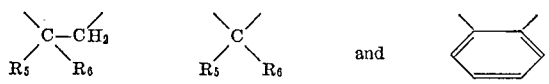

wherein $R_5$ is as above and $R_6$ is selected from the group consisting of hydrogen and lower alkyl; preferably hydrogen.

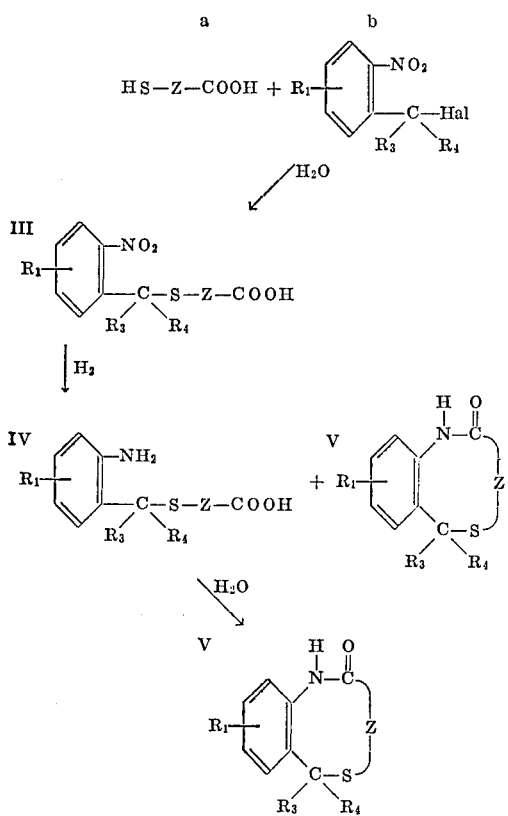

The first stage of the embodiment illustrated above $(a+b \rightarrow III)$ comprises reacting a 2-nitrobenzyl halide with a mercapto organic acid in the presence of a base and an inert solvent. Any mercepto organic acid can be employed in the first stage. In one aspect, the mercapto organic acid utilized in the first stage can be either an α-mercapto acid or a β-mercapto acid, that is, be an acid which contains a sulfhydryl group joined either to the carbon atom which is next to the carboxyl group of the acid (α-mercapto acid) or to the carbon atom which is one carbon atom removed from the carboxyl group, i.e.

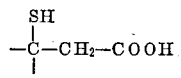

(β-mercapto acid). In a preferred aspect, the α- or β-sulfhydryl group containing acid includes, at the most, two carboxy groups. The acid, therefore, preferably can be either a mono-basic lower alkanoic acid such as α-mercapto acetic acid, α-mercapto propionic acid and β-mercapto propionic acid, or a monobasic benzoic acid such as thiosalicyclic acid or a lower alkanoic dibasic acid such as α-mercapto succinic acid and α-mercapto malonic acid. While the temperature employed during the first stage are not critical, it is preferred to operate at a temperature range between —10° C. to 90° C., more preferably between 0° C. to room temperature. Any convenient base can be suitably employed in the first stage. Bases suitable for use in the first stage can be organic and inorganic bases such as sodium hydroxide, ammonium hydroxide, potassium hydroxide, amines such as pyridine, and the like. Similarly, any suitable solvent may be efficaciously employed in the first stage and such solvents are represented by ketones such as acetone and methyl ethyl ketone, alkanols such as methanol, ethanol and propanol and ethers such as ethyl ether and dioxane. Suitable 2-nitrobenzyl halides are 2-nitrobenzylchloride, 2-nitrobenzylbromide, 4-chloro-2-nitrobenzylbromide, α-α-dimethyl-2-nitrobenzylbromide and α-methyl-2-nitrobenzylbromide.

Compounds corresponding to Formula III above, are novel and are useful as intermediates in forming compounds corresponding to Formula I. Thus, they constitute a part of the present invention.

The second stage (III→IV+V) is accomplished efficaciously by hydrogenating compounds corresponding to Formula III above (2-nitrobenzyl mercapto acids) catalytically in the presence of conventional hydrogenating agents such as palladium on charcoal, platinum and the like. The second stage is preferably conducted in the presence of an inert organic solvent which may be methanol, ethanol, acetone, methyl ethyl ketone and the like.

The third stage (IV→V) is accomplished, in one aspect, by heating the mixture resulting from the second stage. In one embodiment, the mixture resulting from the second stage is dissolved in a suitable inert organic solvent and heated, preferably under reflux conditions. As solvents suitable for dissolving the mixture resulting from the second stage can be included such inert organic solvents as xylene, benzene, toluene, tetrahydrofurane, heptane, pentane and chlorinated derivatives of the aromatic solvents included hereinabove. While a two-step procedure for the formation of compound V is illustrated diagrammatically hereinabove insofar as the reaction of III→IV→V is concerned, i.e. reduction followed by heating (preferably under refluxing conditions) this same end can be effected by simultaneously reducing and heating (preferably under refluxing conditions) compound III whereby to directly obtain compound V in good yields.

In another embodiment, the mixture resulting from the second stage is dissolved in a suitable organic solvent and treated with dicyclohexylcarbodiimide. Such a treatment results in the desired cyclization of compounds corresponding to Formula IV above. As suitable solvents utilizable in this embodiment can be included such inert organic solvents as tetrahydrofurane, benzene, ethers such as ethyl ether, and halogenated derivatives of hydrocarbons such as methylene chloride and fluorinated benzenes.

In yet another embodiment, compounds of the Formula IV above can be directly heated (i.e. in the absence of a dispersing or solvating medium) whereby to yield compounds of the Formula V above.

In yet another route for preparing the compounds of Formula V above wherein Z is a

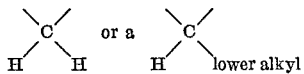

group, i.e. compounds of the formula

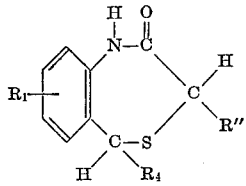

VI wherein $R_1$ and $R_4$ are as above and R" is selected from the group consisting of hydrogen and lower alkyl; compounds of the formula

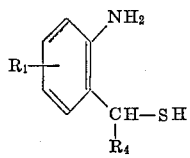

VII wherein $R_1$ and $R_4$ are as above are treated with a compound of the formula

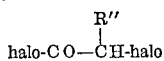

wherein R" is selected from the group consisting of hydrogen and lower alkyl, preferably, in an alkaline medium.

The alkaline medium can be provided by any suitable base. Illustrative of such suitable bases are alkali metal hydroxides, e.g., sodium hydroxide, potassium hydroxide, alkaline earth metal hydroxides and the like. Temperature is not critical and, accordingly, any suitable temperature can be employed in this reaction step.

Compounds of Formula VII above can be prepared via the reaction of a compound of the formula

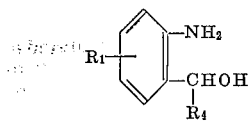

VIII wherein $R_1$ and $R_4$ are as above with carbon disulfide in the presence of a tertiary amine such as triethyl amine and the like and any suitable inert organic solvent which may be a lower alkanol such as ethanol and the like. The resultant compound which is of the formula

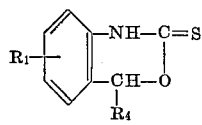

IX wherein $R_1$ and $R_4$ are as above is heated whereby to prepare a compound of the formula

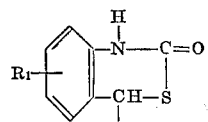

X wherein $R_1$ and $R_4$ are as above.

The last mentioned compound is ring-opened to the corresponding compound of Formula VII above by the treatment thereof with an aqueous alkaline medium such as potassium hydroxide in water.

Compounds of Formula X above can also be prepared from the corresponding compounds of Formula VIII above via the treatment of the latter with carbon disulphide and a base such as potassium hydroxide in the presence of any suitable inert organic solvent such as a lower alkanol, e.g., ethanol, methanol and the like whereby to prepare a compound of the formula

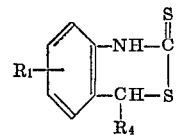

wherein $R_1$ and $R_4$ are as above.

The resultant compound is then treated with an oxidizing agent which may be hydrogen peroxide in the presence of any suitable base such as potassium hydroxide whereby to prepare the correponding compounds of Formula X above.

The procedure set out above for preparing compounds of Formula VI above does not constitute part of this invention.

In one procedure, the product resulting from the final stage of the process illustrated diagrammatically hereinabove (compounds corresponding to Formula V) is treated with hydrogen peroxide at a temperature of 50°–150°, preferably 80°–120° in the presence of acetic acid whereby to form a compound corresponding to the formula of

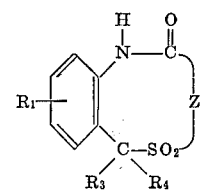

XI wherein $R_1$, $R_3$, $R_4$ and Z have the same meanings as ascribed thereto hereinabove.

In another preparative procedure, the compound resulting from the final stage illustrated diagrammatically above (compounds corresponding to Formula V) is treated with lithium aluminum hydride at a temperature of −20°−+90°, preferably −5°−+40° in the presence of an inert organic solvent such as tetrahydrofuran or an ether such as diethyl ether, methyl ethyl ether and the like to yield a compound corresponding to the formula of

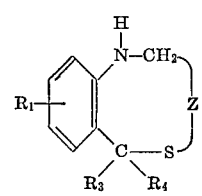

XII wherein $R_1$, $R_3$, $R_4$ and Z have the meanings ascribed thereto hereinabove.

These compounds are basic and thus form acid addition salts with pharmaceutically acceptable acids as is described more fully hereinabove.

Compounds corresponding to Formula XII above can be treated with sodium periodate whereby to form a 4-oxide derivative thereof. Compounds corresponding to Formula XII can also be treated with hydrogen peroxide whereby to yield a 4,4-dioxide derivative thereof.

In yet another procedure, the product resulting from the performance of the final stage of the process illustrated diagrammatically hereinabove (compounds corresponding to Formula V) is treated with sodium periodate in the presence of an inert organic solvent such as an alcohol, i.e. methanol, ethanol and the like or a ketone such as acetone, methyl ethyl ketone, dioxane and the like at a low temperature, i.e. in the range of −20° to +60°, preferably −5° to +40° to yield a compound corresponding to the formula of

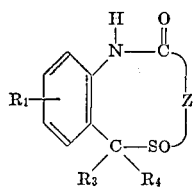

XIII wherein $R_1$, $R_3$, $R_4$ and Z have the meanings ascribed thereto hereinabove.

Compounds corresponding to Formula XI can be prepared directly from compounds corresponding to Formula III above by subjecting the latter to the action of hydrogen peroxide whereby to form compounds corresponding to the formula

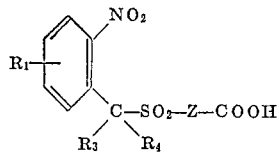

XIV wherein $R_1$, $R_3$, $R_4$ and Z have the meanings ascribed thereto hereinabove.

The product is reduced, e.g. hydrogenated, catalytically in the presence of conventional hydrogenating catalysts such as platinum or palladium on charcoal whereby to yield the 2-amino analogs of the compounds corresponding to Formula XIV above. The said 2-amino analogs are dehydrated to cause the cyclization of the same and, thus, yield compounds corresponding to Formula XI above. The reduction and dehydration steps utilized in this method for preparing compound XI above can be effected either by sequentially reducing and dehydrating the compound corresponding to Formula XIV above or by simultaneously reducing and dehydrating the last-mentioned compound.

Compounds of Formula I above wherein B is thio and $R_6$ is lower alkanoyloxy can be prepared from the corresponding compounds of Formula I above wherein B is sulfinyl and $R_6$ is hydrogen by treatment of the last-mentioned compounds with an anhydride of a lower alkanoic acid, e.g. acetic anhydride. The so-prepared compounds can be treated with sodium periodate in the manner set out above whereby to obtain a compound of the Formula I above wherein B is sulfinyl and $R_6$ is lower alkanoyloxy. Alternatively, the said so-formed compounds can be treated with hydrogen peroxide in the manner set out above whereby to obtain compounds of Formula I wherein B is sulfonyl and $R_6$ is lower alkanoyloxy.

Compounds corresponding to Formula I wherein $R_2$ is lower alkyl can be synthesized from compounds corresponding to Formula I wherein $R_2$ is hydrogen by alkylating such compounds. The alkylation can proceed, for example, by forming the sodio derivative of a compound corresponding to Formula I wherein $R_2$ is hydrogen with a sodium alcoholate such as sodium methoxide in an inert organic solvent such as toluene and then reacting the so-formed sodio derivative with a dialkyl sulfate or an alkyl halide in an inert solvent, for example, a hydrocarbon or dimethyl formamide. Suitable dialkyl sulfates may be represented by dimethyl sulfate. Similarly, suitable alkyl halides may be represented by methyl iodide. Compounds of Formula I above wherein $R_2$ is lower alkyl can also be obtained by providing a lower alkyl group on the amino function of compounds of Formula IV above according to conventional techniques and thereafter ring closing the so-formed compounds.

Compounds corresponding to Formula I are useful as choleretic agents. They can be administered in conventional pharmaceutical dosage forms with dosage adjusted to suit individual requirements. For example, they can be administered orally in capsule form. An especially useful choleretic agent is 8-chloro-1,2,3,5-tetrahydro-4,1-benzothiazepine and the acid addition salts thereof with pharmaceutically acceptable acids. Compounds of Formula I above unsubstituted in position-1, i.e. wherein $R_2$ is hydrogen are also useful as intermediates in the preparation of compounds of Formula N infra.

As is noted above, another aspect of the present invention relates to 4,1-benzothiazepines and 5,1-benzothiazocines having a basic side chain in the 1-position, to methods for producing such compounds and to intermediates useful in the preparation thereof.

Such 4,1-benzothiazepines and 5,1-benzothiazocines of this aspect of the present invention can be represented by the following structural formula

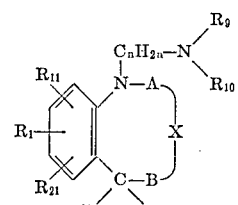

N wherein X is selected from the group consisting of

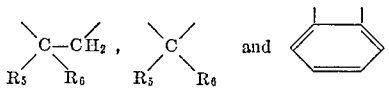

$R_1$, $R_{11}$ and $R_{21}$ represent hydrogen, halogen, lower alkyl or lower alkoxy; $R_3$ represents hydrogen or lower alkyl, $R_4$ represents hydrogen, lower alkyl or a

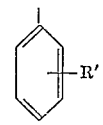

group wherein R' is selected from the group consisting of hydrogen and halogen; A represents a carbonyl group or a methylene group; B represents a thio, a sulfinyl or a sulfonyl group; $R_5$ represents phenyl, hydrogen, lower alkyl or carboxy lower alkyl; $R_6$ represents hydrogen, lower alkyl or lower alkanoyloxy; n is a whole integer from 2–7; $R_9$ and $R_{10}$ are selected from the group consisting of, individually, hydrogen, lower alkyl and benzyl, and taken together with the nitrogen atom, a mono-heterocyclic ring structure including, at the most, one further hetero atom selected from the group consisting of nitrogen and oxygen and, at the most, one substituent on the heterocyclic ring nucleus, at least one of $R_9$ and $R_{10}$ being other than hydrogen.

The significance of the symbols A, X, B, $R_1$, $R_3$, $R_4$, $R_5$, $R_6$, $R_{11}$ and $R_{21}$ are discussed hereinabove. As above, preferred are those compounds wherein $R_{11}$ and $R_{21}$ are both hydrogen.

The symbols $R_9$ and $R_{10}$ have the following significance. $R_9$ and $R_{10}$, when individual radicals, represent hydrogen, benzyl or a straight or branched hydrocarbon chain having 1–7 carbon atoms in the chain, such as methyl, ethyl, propyl, isopropyl, butyl or the like. By the term benzyl, there is contemplated the benzyl radical per se as well as substituted derivatives thereof, e.g. lower alkyl benzyl and the like. $R_9$ and $R_{10}$ when taken together, are divalent groups, which together with the nitrogen atom to which they are attached, form a 5- or 6-membered mono-heterocyclic ring structure. Preferably, the last-mentioned ring structure is selected from the group consisting of piperazinyl, piperidyl, (including 1-piperidyl, e.g. piperidino), pyrrolidinyl, morpholinyl and substituted derivatives thereof. Advantageously, if there is a substituent on the heterocyclic ring structure, the latter contains an additional nitrogen atom and the substituent is joined thereto thereat. Among such substituents suitable for the purposes of the present invention may be included branched or straight chain lower alkyl groups, such as methyl, ethyl, and the like and hydroxy-lower alkyl groups such as hydroxyethyl and the like. In a particular advantageous embodiment in this aspect of the present invention, $R_9$ and $R_{10}$ are both lower alkyl or one of $R_9$ and $R_{10}$ is hydrogen and the other of $R_9$ and $R_{10}$ is lower alkyl.

When $R_9$ and $R_{10}$ combine to form a ring, the said heterocyclic ring structure so-formed is preferably saturated and contains 5- or 6-members in the ring. Thus, $R_9$ and $R_{10}$ when taken together with the nitrogen atom and, at the most, one further hetero atom selected from the group consisting of oxygen and nitrogen, and, at the most, one substituent of the ring represents a member selected from the group consisting of N-lower alkyl-piperazinyl, N-hydroxy-lower alkyl-piperazinyl, pyrrolidinyl, piperazinyl, morpholinyl, piperidyl (including 1-piperidyl, e.g., piperidino). Thus, $R_9$ and $R_{10}$ when taken together can represent, for example, a lower alkylene chain such as a polymethylene chain of four or five carbon atoms, lower alkyleneoxy-lower alkylene or N-$R_8$-lower alkylene-aza-lower alkylene, wherein $R_8$ is selected from the group consisting of lower alkyl, hydroxy-lower alkyl and hydrogen.

Compounds of Formula N above wherein $R_6$ is lower alkanoyloxy and B is thio can be prepared from the corresponding compounds of Formula N above wherein B is sulfinyl and $R_6$ is hydrogen by treating the last-mentioned compounds with an anhydride of a lower alkanoic acid, e.g. acetic anhydride. Alternatively, compounds of Formula N above wherein $R_6$ is lower alkanoyloxy can be prepared from the corresponding compounds of Formula I above wherein $R_1$ is hydrogen and $R_6$ is lower alkanoyloxy, by providing the said basic side chain directly thereon in a manner more particularly hereinafter described.

In addition to the compounds of Formula N above, there are also encompassed within the purview of this aspect of the present invention, the pharmaceutically acceptable salts of said compounds. The compounds of Formula N above form pharmaceutically acceptable acid addition salts with one or more moles (depending on the number of basic nitrogen atoms present) of a pharmaceutically acceptable acid, for example, with inorganic and organic acids such as hydrochloric acid, hydrobromic acid, sulfuric acid, phosphoric acid, citric acid, tartaric acid, salicylic acid, toluene-sulfonic acid, ascorbic acid, maleic acid, succinic acid, formic acid, acetic acid and the like.

In one embodiment of this aspect of the present invention, the novel compounds of Formula N above can be prepared by a process which comprises reacting a compound of the Formula I above wherein $R_2$ is hydrogen, i.e. a compound of the formula

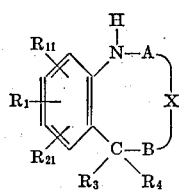

wherein X is selected from the group consisting of

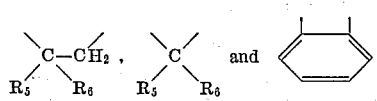

$R_1$, $R_{11}$ and $R_{21}$ are selected from the group consisting of hydrogen, halogen, lower alkyl and lower alkoxy; $R_3$ is selected from the group consisting of hydrogen and lower alkyl, $R_4$ is selected from the group consisting of hydrogen, lower alkyl and

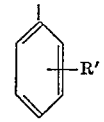

wherein R' is selected from the group consisting of hydrogen and halogen; A is selected from the group consisting of carbonyl and methylene; B is selected from the group consisting of thio, sulfinyl and sulfonyl; $R_5$ is selected from the group consisting of phenyl, hydrogen, lower alkyl and carboxy lower alkyl and $R_6$ is selected from the group consisting of hydrogen, lower alkyl and lower alkanoyloxy with a compound having the formula $$W-C_nH_{2n}-W'$$

wherein $n$ represents a whole integer from 2 to 7 and W and W' are the same or different halogen atoms and, advantageously, represent members selected from the group consisting of chlorine, bromine and iodine, preferably after first effecting conversion of the said unsubstituted compounds into the 1-sodio derivatives thereof. In a preferred embodiment, W is bromine and W' is chlorine.

While in this process step, W is indicated as being halogen, any appropriate group which will function similarly as halogen in this process step is included within the purview of the present invention. Thus, groups such as mesyloxy or an arylsulfonyloxy derivative, e.g. tosyloxy may be employed in this process step and hence, are contemplated. All that is required of the group W is that it permit alkylation of the 1-unsubstituted compounds to corresponding compounds of the Formula M. The same is equally applicable to W in compounds of the formula

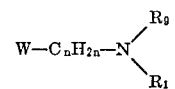

employed in the alternate procedure for preparing compounds of the Formula N, which alternate procedure is discussed hereinafter.

The resulting compounds which are of the formula

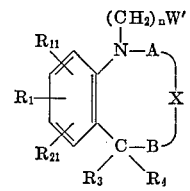

M wherein $n$, W', A, B, X, $R_1$, $R_{11}$, $R_{21}$, $R_3$ and $R_4$ have the same meaning as above are then reacted with a primary or secondary amine having a formula of

wherein $R_9$ and $R_{10}$ are as above to thereby obtain compounds of the Formula N above. Compounds of Formula M above are novel and are useful as intermediates in the preparation of therapeutically useful compounds, i.e. the compounds of Formula N above. Thus, they constitute a part of the present invention.

Here again, while a halogen group is illustrated hereinabove, in view of the preference therefore for the purposes of the present invention, it is, of course, to be understood that any equivalent leaving group such as tosyloxy or another aryl sulfonyloxy grouping, e.g. benzene sulfonyloxy, mesyloxy and the like can be present in a compound of the Formula M in place of a halogen group. All that is required of the leaving group is that it function efficaciously in the process aspect, that is, that it be a suitable leaving group for the purposes of the present invention and it is intended that any such group be included within the purview of the present invention.

The first stage of the above reaction, i.e. the formation of compounds of Formula M via the reaction of compounds of Formula I above wherein $R_2$ is hydrogen with compounds of the Formula W—$C_nH_{2n}$—W′, can be conducted in an inert organic solvent utilizing one or more solvents such as methanol, ethanol, dimethylformamide, benzene, toluene, N-methyl pyrrolidone or the like. Temperature and pressure are not critical and the reaction can be carried out at room temperature or at atmospheric temperature or at elevated temperatures and/or elevated pressures. Any conventional reagent, for example, alkali metal lower alkoxides, alkali metal hydrides and alkali metal amides, such as sodium methoxide, sodium hydride, sodamide and the like can be employed to form the 1-sodio derivative of compounds of Formula I above unsubstituted in position-1. Advantageously, sodamide is employed.

The second stage of the process described above, i.e. the formation of compounds of Formula N above from compounds of Formula M above, can be conducted in an inert organic solvent medium utilizing one or more inert organic solvents such as, for example, ethers such as dioxane, dimethylformamide and the like. Here again, temperature and pressure are not critical and the reaction can be carried out at or below room temperature and at atmospheric pressure or at elevated temperatures and/or elevated pressures. The said second stage proceeds preferably in the presence of an alkali metal halide such as, for example, sodium iodide.

Any primary or secondary amine of the formula

can be suitably employed in the second stage wherein $R_9$ and $R_{10}$ have the same meaning as attributed thereto hereinabove. If a secondary amine is utilized, the two carbon atoms joined to the nitrogen atom of the amine can, respectfully, form a part of a group which exists independently of the other group. Therefore, such carbon atoms can individually comprise a part of a straight or branched chain aliphatic radical such as methyl, ethyl, propyl, isopropyl and the like. Alternatively, such carbon atoms can comprise part of a divalent radical and such radicals can combine with each other directly, or through the said one further hetero atom to form a group such as pentamethylene, tetramethylene, ethylene oxyethylene and ethyleneaza ethylene.

Representative of compounds corresponding to the Formula W—$C_nH_{2n}$—W′ above suitable for utilization in the first stage of the hereinabove described process are 1-bromo-3-chloropropane, 2-bromoethyl chloride, 1-bromo-4-chlorobutane, 1,3-dibromopropane and 1,3-dibromobutane.

In an alternate procedure for preparing compounds of the Formula N above, compounds of Formula I above unsubstituted in the 1-position, i.e., compounds of the Formula I above wherein $R_2$ is hydrogen, are reacted, preferably after first effecting conversion of the said unsubstituted compounds into their 1-sodio derivatives, with an amino-lower alkyl halide of the formula

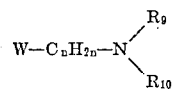

wherein $R_9$ and $R_{10}$ have the same meaning as above and W is a halogen atom preferably selected from the group consisting of chlorine, bromine and iodine.

The above reaction can be conducted in an inert organic solvent utilizing one or more inert organic solvents such as dioxane, an alkanol such as methanol, dimethylformamide and the like. Temperature and pressure are not critical and the reaction can be carried out at above, below or at elevated temperatures and/or pressures. Here again, conventional reagents such as alkali metal lower alkoxides, alkali metal hydrides and alkali metal amides, e.g., sodium methoxide, sodium hydride, sodamide and the like, can be utilized to form the 1-alkalimetal derivative of compounds of Formula I above wherein $R_2$ is hydrogen.

An especially preferred class of compounds within the purview of this aspect of the present invention are compounds of the formula

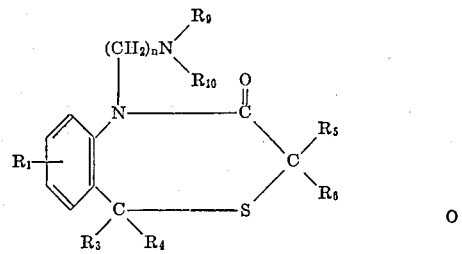

O wherein $R_1$ is selected from the group consisting of hydrogen, halogen, lower alkyl and lower alkoxy; $R_3$ is selected from the group consisting of hydrogen and lower alkyl; $R_4$ is selected from the group consisting of hydrogen, lower alkyl and

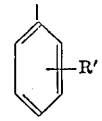

wherein R′ is selected from the group consisting of hydrogen and halogen; $R_5$ is selected from the group consisting of hydrogen, phenyl, lower alkyl and carboxy lower alkyl; $R_6$ is selected from the group consisting of hydrogen, lower alkyl and lower alkanoyloxy; $n$ is a whole integer from 2 to 7 and $R_9$ and $R_{10}$ are, individually, selected from the group consisting of hydrogen, lower alkyl, and benzyl, and, taken together with the nitrogen atom, a monoheterocyclic ring structure including, at the most, one further hetero atom selected from the group consisting of nitrogen and oxygen and, at the most, one substituent on the heterocyclic ring nucleus, at least one of $R_9$ and $R_{10}$ being other than hydrogen.

Preferred are compounds of Formula O above wherein $R_3$, $R_4$, and $R_6$ are all hydrogen. Particularly advantageous are compounds of Formula O above wherein $R_3$, $R_4$ and $R_6$ are all hydrogen and $R_9$ and $R_{10}$ are either both lower alkyl or one of $R_9$ and $R_{10}$ is hydrogen and the other of $R_9$ and $R_{10}$ is lower alkyl. Most preferred are compounds of the Formula 8-halo-1-(di-lower alkyl amino lower alkyl)-3,5-dihydro-3-$R_5$-4, 1-benzothiazepin-2(1H)-one wherein $R_5$ is hydrogen and lower alkyl and acid addition salts thereof with pharmaceutically acceptable acids.

Compounds of the Formula N above wherein A is a methylene group and B is thio are most preferentially prepared by treating the corresponding compound of the Formula N above wherein A is a carbonyl group with any suitable reducing system. Preferred for effecting the desired conversion is hydrogenation in the presence of a hydrogenation catalyst such as, for example, lithium aluminum hydride and diisobutyl aluminum hydride. While temperature is not a critical aspect of the reduction step, it is preferred to effect the same at a temperature of from about —20° to about plus 120° C., more preferentially from about —5° to about 120° C. in the presence of an inert organic solvent. Among the many inert organic solvents suitable for the purpose of the present invention may be included tetrahydrofuran, an ether such as diethyl ether and methyl ether or the like and an aromatic hydrocarbon such as toluene and benzene or any suitable solvent.

As described above in connection with Formula I above, compounds of the Formula N above wherein B is thio can be oxidized with an alkali metal periodate such as sodium periodate whereby to prepare a compound of the Formula N above wherein B is sulfinyl.

As is noted above and also with Formula I above, compounds of the Formula N above wherein B is thio and $R_6$ is lower alkanoyloxy can be prepared from the corresponding compounds of the Formula N above wherein B is sulfinyl and $R_6$ is hydrogen by treating the last-mentioned compound with an anhydride of a lower alkanoic acid such as acetic anhydride. The so-obtained compound can be treated with sodium periodate in the manner set out above whereby to obtain a compound of the Formula N above wherein B is sulfinyl and $R_6$ is lower alkanoyloxy. Alternatively, the compounds of Formula N above wherein B is thio and $R_6$ is lower alkanoyloxy can be treated with hydrogen peroxide whereby to obtain compounds of the Formula N above wherein B is sulfonyl and $R_6$ is lower alkanoyloxy.

The compounds of Formula N above (and obviously, compounds of Formula O above) as well as their pharmaceutically acceptable acid addition salts are characterized by their antidepressant action on the central nervous system and are useful as anti-depressants. The compounds are useful, not only in the relief of symptomatology associated with depression of the central nervous system, but are also useful in the prevention and reversal of central nervous system depression caused by exogenous chemical agents. They can be administered internally, for example, parenterally or enterally, in conventional pharmaceutical dosage forms with dosage adjusted to fit the exigencies of a particular therapeutic situation. The pharmaceutical dosage forms may be prepared by incorporating the active ingredient in conventional liquid or solid vehicles to thereby provide elixirs, suspensions, tablets, capsules powders and the like according to accepted pharmaceutical practice.

Example 1

To the solution of 69 g. o-nitrotoluene in 300 ml. carbon tetrachloride were added 90 g. of N-bromosuccinimide and 2 g. of benzoylperoxide, and the suspension refluxed for 3 hours. After cooling, succinimide was filtered off, and the solution evaporated to dryness. The crude o-nitrobenzylbromide was dissolved in 200 ml. acetone, and the solution carefully added to an ice-cold stirred solution of 46 g. of mercaptoacetic acid and 40 g. sodium hydroxide in 300 ml. of water. The reaction mixture was stirred for 24 hours at room temperature, diluted with water, extracted with methylenechloride, then acidified with acetic acid and extracted again with methylene chloride. This last extract was washed with water, dried over anhydrous sodium sulfate and evaporated. The crystalline residue was recrystallized from acetone-hexane giving (2-nitrobenzylmercapto)acetic acid, M.P. 99–103°.

Example 2

To the solution of 22.7 g. of (2-nitrobenzylmercapto)-acetic acid in 1200 ml. methanol were added 3.8 g. of 10% palladium on carbon catalyst, and the suspension hydrogenated at room temperature at a pressure of 65–100 p.s.i. until the theoretical amount of hydrogen was absorbed. The catalyst was filtered off and the solution evaported. The residue was taken up in 2 liters of xylene and the solution was refluxed for two hours with slow distillation of xylene. After cooling, the crystalline precipitate was filtered off and recrystallized from acetone yielding 3,5-dihydro - 4,1-benzothiazepin - 2(1H)-one, M.P. 218–223°.

Example 3

42 ml. of 0.5 M sodium periodate solution were added to the ice-cooled suspension of 3.6 g. of 3,5-dihydro-4,1-benzothiazepin-2(1H)-one in 250 ml. methanol. This mixture was stirred for 7 hours in an ice bath, then three days at room temperature. The precipitate (sodium iodate) was filtered off, and the solution evaporated to dryness. The residue was recrystallized from acetone giving 3,5-dihydro-4,1-benzothiazepin-2(1H)-one 4-oxide, M.P. 255.5–256°.

Example 4

3.58 g. of 3,5-dihydro-4,1-benzothiazepin-2(1H)-one were dissolved in 150 ml. glacial acetic acid and, after addition of 4.5 ml. of 30% hydrogen peroxide, the reaction mixture was heated for two hours to 100°, and then evaporated. The crystalline residue was recrystallized from acetone giving 3,5-dihydro - 4,1-benzothiazepin-2(1H)-one 4,4-dioxide, M.P. 241–242°.

Example 5

To the suspension of 4 g. lithium aluminum hydride in 400 ml. tetrahydrofuran anhydrous cooled at 0°, was added slowly a solution of 4.5 g. of 3,5-dihydro-4,1-benzothiazepin-2(1H)-one in 350 ml. tetrahydrofuran anhydrous. The mixture was stirred for 24 hours at room temperature. After cooling in an ice-bath for a short time, a saturated solution of sodium sulfate was added slowly to the mixture until hydrogen evolved. Thereafter, crystalline sodium sulfate anhydrous was added and filtered. The solution was evaporated and the crystalline residue was recrystallized from methanol giving 1,2,3,5-tetrahydro-4,1-benzothiazepine, M.P. 85.5–87.5°.

The addition of an ether solution of hydrochloro acid to the acetone solution of the base was followed by evaporation to dryness. The noncrystalline residue was crystallized from an ethanol-ether mixture to give 1,2,3,5-tetrahydro - 4,1 - benzothiazepine hydrochloride, M.P. 193–197°.

Example 6

90 g. of N-bromosuccinimide and 2 g. of benzoylperoxide were added to the solution of 4-chloro-2-nitrotoluene in 600 ml. carbon tetrachloride and the reaction mixture refluxed for 24 hours. After cooling, succinimide was filtered off and the solution evaporated to dryness. This crude 4-chloro-2-nitro-benzylbromide was dissolved in 200 ml. acetone and added slowly at 0° to the solution of 46 g. mercaptoacetic acid and 40 g. sodium hydroxide in 500 ml. of water. The mixture was stirred at room temperature for 3 days, then diluted with water, extracted with methylene chloride then made acidic with acetic acid and again extracted with methylene chloride. The last extract was washed with water, dried and evaporated. The residue was crystallized from an acetone-hexane mixture giving (4-chloro-2-nitrobenzylmercapto)acetic acid, M.P. 107–1110.

Example 7

To the solution of 26 g. of (4-chloro-2-nitrobenzylmercapto)-acetic acid in 1200 ml. methanol were added 3.5 g. of 10% palladium on carbon catalyst and the mixture hydrogenated at room temperature and 180–210 p.s.i. pressure until the theoretical amount of hydrogen was taken up. It was then filtered and evaporated to dryness. The residue was crystallized from methanol giving 8-chloro - 3,5-dihydro - 4,1-benzothiazepin - 2(1H)-one, M.P. 222–223°.

Example 8

To the suspension of 4.28 g. of 8-chloro-3,5-dihydro-4,1-benzothiazepin-2(1H)-one in 250 ml. methanol at 0°, were added 42 ml. of 0.5 M sodium periodate solution. This mixture was stirred for 7 hours in an ice bath and then for three days at room temperature. The precipitated sodium iodate was filtered off and the solution evaporated to dryness. The residue was recrystallized from an acetone-ether mixture and gave 8-chloro-3,5-dihydro-4,1-benzothiazepin-2(1H)-one 4-oxide, M.P. 245–248°.

Example 9

2.1 g. of 8-chloro-3,5-dihydro-4,1-benzothiazepin-2(1H)-one were dissolved in 75 ml. glacial acetic acid containing 2.24 ml. of 30% hydrogen peroxide. This solution was heated for two hours at 100° when the product crystallized. After cooling, the precipitate was filtered off, recrystallized from acetone giving 8-chloro-3,5-dihydro - 4,1-benzothiazepin-2(1H)-one 4,4-dioxide which transforms and decomposes at 330°.

Example 10

To a suspension of 4 g. of lithium aluminum hydride in 400 ml. of tetrahydrofuran anhydrous at 0°, was carefully added a solution of 5.35 g. of 8-chloro-3,5-dihydro-4,1-benzothiazepin-2(1H)-one in 350 ml. tetrahydrofuran anhydrous. The mixture was stirred for 3 hours at room temperature. After cooling in an ice-bath for a short time, a saturated solution of sodium sulfate was added slowly until hydrogen evolved. Thereafter, crystalline sodium sulfate anhydrous was added and the resultant mixture filtered. The solution was evaporated and the crystalline residue was recrystallized from methanol giving 8 - chloro - 1,2,3,5 - tetrahydro - 4,1 - benzothiazepine, M.P. 109–111°.

Example 11

A solution of 10.44 g. of (4 - chloro - 2 - nitrobenzylmercapto)acetic acid in 300 ml. glacial acetic acid containing 9 ml. of 30% hydrogen peroxide was heated for 2 hours at 100°, then evaporated and the residue crystallized from methanol. (4 - chloro - 2 - nitro - benzylsulfonyl)acetic acid resulted which was found to melt at 141–147°.

Example 12

0.3 g of 10% palladium on a carbon catalyst were added to a solution of 3 g. of (4 - chloro - 2 - nitrobenzylsulfonyl)acetic acid in 300 ml. of methanol. Hydrogenation was continued at room temperature and 60–100 p.s.i. pressure until 3 mol equivalent of hydrogen was taken up. The resultant reaction mixture was then filtered and evaporated. Crystallization of the residue from isopropanol gave 8 - chloro - 3,5 - dihydro - 4,1-benzothiazepine - 2(1H) - one 4,4 - dioxide which decomposes at 330°.

Example 13

The acetone solution of o - nitrobenzylbromide was carefully added to an ice-cold stirred solution of 53 g. of $\beta$ - mercaptopropionic acid and 40 g. of sodium hydroxide in 300 ml. of water. The reaction mixture was then stirred for 24 hours at room temperature. The reaction mixture was diluted with water, made alkaline and extracted with methylene chloride then made acidic with acetic acid and extracted again with methylene chloride. This last extract was washed with water, dried over sodium sulfate anhydrous and evaporated. The residue was crystallized from an acetone-hexane mixture giving 3-(2-nitrobenzylmercapto)propionic acid, M.P. 83–85°.

Example 14

To the solution of 24.1 g. of 3 - (2 - nitrobenzylmercapto)propionic acid in 1000 ml. of methanol were added 5.5 g. of 10% palladium on carbon catalyst. The resultant mixture was hydrogenated at room temperature and 90 p.s.i. pressure until 3 mol equivalent of hydrogen was taken up, filtered and evaporated. The residue was crystallized from an ether-petroleum ether mxiture giving 3 - (2 - aminobenzylmercapto)propionic acid.

Example 15

The solution of 5 g. of 3 - (2 - aminobenzylmercapto)propionic acid in 200 ml. of xylene anhydrous was boiled for 2 hours and then evaporated. The residue was chromatographed on an aluminum oxide column. The fractions were eluted with benzene. The eluant was evaporated and the residue recrystallized from acetone to yield 4,6 - dihydro - 1H - 5,1 - benzothiazocin - 2(3H) - one, M.P. 194–198.5°.

Example 16

The solution of 15.2 g. of 4,6 - dihydro - 1H - 5,1-benzothiazocin - 2(3H) - one and 17.3 ml. of 30% hydrogen peroxide in 150 ml. of acetic acid was heated at 100° for 10 minutes. The solution was evaporated and the residue was chromatographed on aluminum oxide. The fractions were eluted with benzene and crystallized from acetone giving 4,6 - dihydro - 1H - 5,1 - benzothiazocin - 2(3H) - one 5 - oxide, M.P. 230–232°.

Example 17

To the solution of 4 g. of lithium aluminum hydride in 400 ml. of tetrahydrofuran anhydrous cooled at 0°, was added slowly a solution of 3.9 g. of 4,6 - dihydro-1H - 5,1 - benzothiazocin - 2(1H) - one in 220 ml. of tetrahydrofuran anhydrous. The mixture was stirred 24 hours at room temperature. After cooling in an ice-bath, a saturated solution of sodium sulfate was added slowly until hydrogen evolved. Thereafter, crystalline sodium sulfate anhydrous was added and the resultant mixture was filtered. The solution was evaporated and the starting material was separated as nonsoluble in ether (1 g., M.P. 188–192°). The ether solution was evaporated and the oily residue remaining from such evaporation was taken up in acetone. Ether-hydrochloride was added to the acetone solution. After evaporation the residue was crystallized from 95% ethanol giving 1,2,3,4,6 - pentahydro - 5,1 - benzothiazocine hydrochloride, M.P. 216–220°.

Example 18

The solution of 4.8 g. of 3 - (2 - nitrobenzylmercapto)propionic acid and 5 ml. of 30% hydrogen peroxide in 100 ml. of acetic acid was heated for 4 hours at 100° and then evaporated. The crystalline residue was recrystallized from ether giving 3 - (2 - nitrobenzylsulfonyl)propionic acid, M.P. 126–127°.

Example 19

The solution of 5.2 g. of 3 - (2 - nitrobenzylsulfonyl)propionic acid in 300 ml. of methanol was hydrogenated over 0.5 g. of 10% palladium on carbon at room temperature and 90–115 p.s.i. pressure. The solution was filtered and then evaporated. The residue was crystallized from a methanol-ether mixture yielding 3 - (2 - aminobenzylsulfonyl)propionic acid, M.P. 168–172°.

Example 20

A boiling solution of 4.5 g. of 3 - (2 - aminobenzylsulfonyl)propionic acid in 1000 ml. of xylene was slowly distilled for 2 hours. After cooling the crystallized starting material was filtered off and the filtrate evaporated. Recrystallization of the residue from acetone gave 4,6-dihydro - 1H - 5,1 - benzothiazocin - 2(3H) - one 5,5-dioxide, M.P. 287–292°.

The same cyclization can be achieved by melting 3-(2-aminobenzylsulfonyl)propionic acid at 200° for 10 minutes.

Example 21 o-Nitrobenzylbromide was dissolved in 200 ml. of acetone and the resulting solution was carefully added to an ice-cold stirred solution of 75 g. of mercaptosuccinic acid and 60 g. of sodium hydroxide in 450 ml. of water. The resulting solution was stirred for 24 hours at room temperature. The solution was extracted with methylene chloride then made acidic with acetic acid. (o-Nitrobenzylmercapto)succinic acid was filtered off and dried, M.P. 178–182°.

Example 22

To a solution of 8.55 g. of (o-nitrobenzylmercapto)succinic acid in 1200 ml. of methanol was added 1.9 g. of 10% palladium on carbon. The reaction mixture was hydrogenated at room temperature and 85–100 p.s.i. pressure. The solution was filtered, evaporated, and the residue taken up in 1500 ml. of xylene and boiled for 2 hours with slow distillation. After cooling, the crystalline precipitate was filtered off and recrystallized from acetone-ether giving 1,2,3,5-tetrahydro-2-oxo-4,1-benzothiazepine-3-acetic acid, M.P. 224–230°.

Example 23

An alternate procedure for obtaining 1,2,3,5-tetrahydro-2-oxo-4,1-benzothiazepine-3-acetic acid is as follows:

The product of hydrogenation of Example 22 was dissolved in 225 ml. of tetrahydrofuran and to this solution 6.3 g. of dicyclohexylcarbodiimide were added. After standing overnight, dicyclohexylurea was filtered off and the solution concentrated to 100 ml., when an additional amount of dicyclohexylurea separated. The solution was evaporated and the residue crystallized from ethylacetate giving 1,2,3,5-tetrahydro-2-oxo-4,1-benzothiazepine-3-acetic acid, M.P. 220–235°.

Example 24

The suspension of 22.8 g. of (o-nitrobenzylmercapto)succinic acid in 800 ml. of glacial acetic acid and 40 ml. of 30% hydrogen peroxide was heated at 100° for 5 hours and evaporated. The residue was crystallized from water and gave (o-nitrobenzylsulfonyl)succinic acid, M.P. 168–170°.

Example 25

To a solution of 9.5 g. of (o-nitrobenzylsulfonyl)succinic acid in 1200 ml. of tetrahydrofuran was added 1 g. of 10% palladium on carbon. The resultant (o-nitrobenzylsulfonyl)succinic acid mixture was hydrogenated at room temperature and 30–45 p.s.i. pressure. The solution was filtered, and to the filtrate was added 6.2 g. of dicyclohexylcarbodiimide. On the following day it was filtered and the solution evaporated. The crystalline residue was taken up in 100 ml. of dioxane, filtered, and the filtrate evaporated. The residue, crystallized from methanol, gave 2.8 g. of 1,2,3,5-tetrahydro-2-oxo-4,1-benzothiazepine-3-acetic acid 4,4-dioxide, M.P. 264–267°.

Example 26

To the solution of 69 g. of o-nitrotoluene in 300 ml. of carbontetrachloride were added 90 g. of N-bromosuccinimide and 2 g. of benzoylperoxide. The suspension was refluxed for 3 hours. After cooling, succinimide was filtered off and the solution evaporated to dryness. The crude o-nitrobenzylbromide was dissolved in 200 ml. of acetone and the solution added dropwise to an ice-cold stirred solution of 53 g. of thiolactic acid and 40 g. of sodium hydroxide in 300 ml. of water. The reaction mixture was stirred for 24 hours at room temperature, made strongly alkaline, extracted with methylene chloride, then acidified with acetic acid and extracted again with methylene chloride. The last extract was washed with water, dried over anhydrous sodium sulfate and evaporated. The crystalline residue was recrystallized from acetone, yielding (2 - nitrobenzylmercapto)propionic acid, M.P. 130–132°.

Example 27

To the solution of 48.2 g. of (2-nitrobenzylmercapto)lactic acid in 1200 ml. of methanol were added 5 g. of 10% palladium on carbon catalyst, and the suspension hydrogenated at room temperature at a pressure of 200–270 p.s.i. until the theoretical amount of hydrogen was absorbed. The catalyst was filtered off and the solution evaporated. The non-crystalline residue was taken up in 2 liters of xylene, the solution was refluxed for 2 hours with slow distillation of xylene so that the volume was reduced to 1 liter. After cooling, the crystalline precipitate was filtered off and recrystallized from acetone. It gave 3,5 - dihydro - 3 - methyl - 4,1 - benzothiazepin - 2(1H)-one, M.P. 188–189°.

Example 28

To the suspension of 12 g. of lithium aluminum hydride in 1000 ml. of anhydrous tetrahydrofuran cooled at 0° C., was added slowly a solution of 12 g. of 3,5-dihydro-3-methyl-4,1-benzothiazepin-2(1H)-one in 400 ml. of tetrahydrofuran anhydrous. The mixture was stirred 24 hours at room temperature. After cooling in an ice-bath for a short time, a saturated solution of sodium sulfate was added slowly until hydrogen evolved, then crystalline sodium sulfate anhydrous was added and filtered. The solution was evaporated and the residue crystallized from methanol giving 3 - methyl - 1,2,3,5-tetrahydro-4,1-benzothiazepine, M.P. 76–78°.

Example 29

To the suspension of 3.86 g. of 3,5-dihydro-3-methyl-4,1-benzothiazepin-2(1H)-one in 250 ml. of methanol at 0°, were added 42 ml. of 0.5 N sodium periodate solution. The mixture was stirred for 1 hour in an ice-bath, then for 3 hours at room temperature. The precipitated sodium iodate was filtered off and the solution evaporated to dryness. The residue was boiled in acetone. The soluble part was filtered and evaporated. The residue was crystallized from acetone. The resultant product was chromatographed on a silica gel column. The fractions were eluted with 15% ethylacetate-benzene and gave, after recrystallization from acetone, 3,5-dihydro-3-methyl-4,1-benzothiazepin-2(1H)-one 4-oxide, M.P. 220–223°.

Example 30

The mixture of 3 g. of 3,5-dihydro-4,1-benzothiazepin-2(1H)- one 4-oxide and 40 ml. of acetic anhydride was heated for 2 hours at 100°. After 1 hour, a clear solution was obtained. It was filtered and evaporated to dryness. The recrystallization from acetone gave 3-acetoxy-3,5-dihydro-4,1-benzothiazepin-2(1H)-one, M.P. 172–174°.

Example 31

A mixture of 2 g. of 3,5-dihydro-3-methyl-4,1-benzothiazepin-2(1H)-one 4-oxide and 40 ml. of acetic anhydride was heated 5 hours at 100°. The mixture was then evaporated and the residue chromatographed on a silica gel column. The fractions were eluted with 2% ethylacetate-benzene and gave, after crystallization from acetone, 3-acetoxy-3,5-dihydro-3-methyl-4,1-benzothiazepin-2(1H)-one, M.P. 186–187°.

Example 32

To the solution of 69 g. of o-nitrotoluene in 300 ml. of carbontetrachloride were added 90 g. of N-bromosuccinimide and 2 g. of benzoylperoxide, and the suspension refluxed for 3 hours. After cooling, succinimide was filtered off and the solution evaporated to dryness. The crude o-nitrobenzylbromide was dissolved in 200 ml. of acetone, and the solution added dropwise to an ice-cold stirred solution of 77 g. of thiosalicylic acid and 40 g. of sodium hydroxide in 300 ml. of water. The reaction mixture was stirred for 24 hours at room temperature, made strongly alkaline, extracted wtih methylene chloride, then acidified with acetic acid. The precipitate formed was collected and dried. Recrystallization from glacial acetic acid gave 2-(2-nitrobenzylmercapto)benzoic acid, M.P. 205–210° C.

Example 33

To the solution of 11.56 g. of 2-(2-nitrobenzylmercapto)benzoic acid in 1200 ml. of 0.1 N sodium hydroxide solution were added 0.5 g. of 10% palladium on carbon catalyst, and the suspension was hydrogenated at room temperature and 100 p.s.i. pressure. It was then filtered, acidified with acetic acid, and the precipitate collected. The precipitate was dried and purified by chromatography. Recrystallization from ethanol gave 6 g. of 2-(2-aminobenzylmercapto)benzoic acid, M.P. 185–187°.

Example 34

To the solution of 10.36 g. of 2-(2-aminobenzylmercapto)benzoic acid in 1200 ml. of tetrahydrofuran were added 8.25 g. of dicyclohexylcarbodiimide and left overnight at room temperature. The precipitated dicyclohexylurea was filtered off, the filtrate reduced to 300 ml., and additional crop of dicyclohexylurea was removed. It was then evaporated to dryness, and the residue chromatographed on alumina column. The fraction, eluted with 10% ethylacetate-benzene, gave, after recrystallization from methanol, 6H-dibenzo[c.f.][1,5]thiazocin-12(11H)-one, M.P. 266–270°.

Example 35

To a solution of 1.65 g. of 1,2,3,5-tetrahydro-4,1-benzothiazepine in 125 ml. of methanol were added 21 ml. of 0.5 M of sodium periodate solution. During the addition, the temperature was maintained at 0°. The mixture was stirred for 4 hours at room temperature and filtered. The filtrate was evaporated and the residue recrystallized twice from acetone to give 1,2,3,5-tetrahydro-4,1-benzothiazepin 4-oxide, M.P. 158.5–160.5°.

Example 36

A suspension of 10.8 g. of 8-chloro-3,5-dihydro-4,1-benzothiazepin-2(1H)-one and 2.44 g. sodamide in 100 ml. of abs. dioxane was stirred and refluxed for 20 hours. After cooling to 60°, 8.1 g. of diethylaminoethyl chloride in 20 ml. of dioxane was added over a period of 30 minutes. The mixture was stirred and refluxed for 4 hours after which time 5 ml. of methanol was added. The resultant mixture was filtered and the filtrate was evaporated to dryness in vacuo. The oil remaining was dissolved in ethyl acetate and the solution was extracted twice with dilute hydrochloric acid. The aqueous extracts were combined, washed with ether, made alkaline by the addition of 3 N sodium hydroxide and extracted twice with ethyl acetate. The combined ethyl acetate extracts were washed with water, dried over sodium sulfate and evaporated to dryness in vacuo. 8-chloro-1-(2-diethylaminoethyl) - 3,5 - dihydro - 4,1 - benzothiazepin-2(1H)-one as an oil was obtained. The oily base was dissolved in isopropanolic hydrochloric acid and yielded crystalline 8-chloro - 1 - (2-diethylaminoethyl) - 3,5 - dihydro-4,1-benzothiazepin-2(1H)-one hydrochloride upon the addition of ether. Upon recrystallization from methanol/ether, the hydrochloride was found to have a melting point of 214–215°.

Example 37

A suspension of 10.8 g. of 8-chloro-3,5-dihydro-4,1-benzothiazepin-2(1H)-one and 2.44 g. of sodamide in 100 ml. of abs. dioxane was refluxed with stirring for 20 hours. After cooling to 60°, the mixture as added to γ-dimethylaminopropyl chloride in dioxane (liberated from a concentrated solution of 15 g. of the hydrochloride with 6 N sodium hydroxide and extracted with ether, dried over sodium sulfate and evaporated to dryness in vacuo). The resultant mixture was refluxed with stirring for 4 hours. After the addition of 5 ml. of methanol, the mixture was filtered and the filtrate evaporated to dryness in vacuo. The oily residue remaining was dissolved in ethyl acetate and the solution extracted twice with dilute hydrochloric acid. The aqueous extracts were washed with ether, made alkaline by the addition of 3 N sodium hydroxide and extracted twice with ethyl acetate. The extracts were combined and washed with water. After drying over sodium sulfate and evaporating to dryness in vacuo, 8-chloro-1-(3-dimethylaminopropyl)-3,5-dihydro-4,1-benzothiazepin-2(1H)-one as an oil was obtained. The oily base was dissolved in isopropanolic hydrochloric acid and after adding ether, yielded 8-chloro-1-(3-dimethylaminopropyl)-3,5-dihydro - 4,1 - benzothiazepin - 2(1H)-one hydrochloride, melting point 199–201°. After recrystallization from methanol/acetone, the hydrochloride melted at 201–202°.

Example 38

A suspension of 8.5 g. of 8-chloro-3,5-dihydro-4,1-benzothiazepin-2(1H)-one and 1.75 g. of sodamide in 100 ml. of absolute dioxane was refluxed with stirring for 14 hours. To the so-stirred mixture, there was added over a period of 30 minutes, a solution of 4.2 grams of N-(β-chloroethyl)-piperidine in 10 ml. of dioxane. The resultant mixture was refluxed with stirring for 20 hours. The mixture was then filtered and the solvent removed in vacuo leaving a brown oil. The brown oil was dissolved in ethyl acetate and the resultant mixture extracted twice with 3 N hydrochloric acid. The ethyl acetate extracts were washed with ethyl acetate, made alkaline with 3 N sodium hydroxide and extracted three times with dichloromethane. The dichloromethane extracts were combined, washed with water, dried over sodium sulphate and evaporated to dryness leaving an oily residue. On addition of ether to the oily residue, a crystalline product was formed which was removed by filtration. The crystalline product and its mother liquor were dissolved in methanol and treated with isopropanolic hydrochloric acid. Upon the addition of ether, 8-chloro-3,5-dihydro-1-(2-piperidinoethyl)-4,1-benzothiazepin-2(1H)-one hydrochloride was obtained in crystalline form, melting point 242–243°. After refluxing with charcoal in methanol and recrystallization from methanol/ether, the hydrochloride melted at 245–246°.

6 grams of 8-chloro-3,5-dihydro-1-(2-piperidino-ethyl)-4,1-benzothiazepin-2(1H)-one hydrochloride was dissolved in 76 mls. of methanol containing 1.73 grams of sodium methylate. The so-formed solution was evaporated to dryness in vacuo. The residue was suspended in dichloromethane and the resultant suspension filtered. The solvent was removed in vacuo yielding the free base, 8-chloro-3,5 - dihydro - 1(2-piperidino-ethyl)-4,1-benzothiazepin-2(1H)-one.

Example 39

A suspension of 8.5 g. of 8-chloro-3,5-dihydro-4,1-benzothiazepin-2(1H)-one and 1.75 g. of sodamide in 100 ml. of absolute dioxane was refluxed with stirring for 14 hours. To the hot stirred mixture there was added dropwise 7.8 g. of 2-(N-methylbenzylamino)ethyl chloride in 10 ml. of dioxane. The mixture was refluxed with stirring for 4 hours. After the addition of 5 ml. of methanol, the mixture was filtered and the filtrate evaporated to dryness under reduced pressure. The oily residue was dissolved in ethyl acetate and extracted with dilute hydrochloric acid. The aqueous extract was washed with ether, made alkaline by the addition of 3 N sodium hydroxide and extracted twice with ethyl acetate. The combined ethyl acetate extracts were washed with water, dried over sodium sulfate and evaporated in dryness in vacuo, giving the base 8-chloro-3,5-dihydro - 1[2-(N-methylbenzylamino)ethyl]-4,1-benzothiazepin-2(1H)-one as an oil. The oily base was dissolved in 1 N methanolic hydrochloric acid and treated with ether yielding crystalline 8-chloro-3,5-dihydro-1-[2-(N - methylbenzylamino)ethyl] - 4,1 - benzothiazepin-2(1H)-one hydrochloride, melting point 236–237°. The hydrochloride melted at 236° after recrystallization from methanol/ether.

Example 40

A mixture of 20 ml. of methylamine and 28.6 g. of benzaldehyde in 100 ml. of ethanol was kept for four days at 60° and 3 atm. hydrogen pressure. After cooling, 11.8 g. of sodium borohydride was added and the mixture was stirred at room temperature for four hours. The solvent was removed under reduced pressure. The residue was suspended in water and extracted twice with chloroform. The organic extracts were combined, washed with water, dried over sodium sulfate. The solvent was then removed in vacuo leaving an oil. The oil was dissolved in 100 ml. of water and 11.1 g. of ethyleneoxide was added to the so-formed mixture at room temperature. The mixture was kept for 5 hours at 3° and 24 horus at room temperature. After extraction with chloroform, the extract was washed with water, dried over sodium sulfate and evaporated in vacuo. The oily residue was distilled under reduced pressure, giving 2-(N-methylbenzylamino)ethanol, B.P. 73°/0.08 mm.

To a stirred, ice-cold solution of 7.15 g. of 2-(N-methylbenzylamino)ethanol in 20 ml. of benzene, there was added dropwise 3.5 ml. of thionylchloride in 10 ml. of benzene. The mixture was stirred at room temperature for four hours. The solvent was then removed and the resulting solid residue dissolved in water. The so-formed aqueous solution was made alkaline with an aqueous sodium carbonate solution. After repeated extractions with chloroform, the organic extracts were combined, washed with water, dried over sodium sulfate and evaporated to dryness, 2-(N-methylbenzylamino)ethyl chloride was obtained as an oil.

Example 41

To a suspension of 59.4 g. of 8-chloro-3,5-dihydro-4,1-benzothiazepin-2(1H)-one in 400 ml. of dimethylformamide, there was added at 0° over a period of 15 minutes, a solution of 18.7 g. of sodium methylate in 85 ml. of methanol. The clear solution was stirred at room temperature for 15 minutes, 58.2 g. of 1-bromo-3-chloropropane in 50 ml. of dimethylformamide was added at 0° over a period of 15 minutes to the stirred solution. After stirring at room temperature for one hour, the mixture was poured into 500 ml. of water and extracted three times with dichloromethane. The extracts were combined, washed with water, dried over sodium sulfate and evaporated to dryness. From the oily residue, crystalline-8-chloro - 3,5 - dihydro - 1 - (3 - chloropropyl) - 4,1 - benzothiazepin-2(1H)-one was obtained after trituration with ether, melting point 136–140°.

Example 42

A suspension of 10.8 g. of 8-chloro-3,5-dihydro-4,1-benzothiazepin-2(1H)-one and 2.44 g. of sodamide in 100 ml. of dioxane was refluxed with stirring for 15 hours. After cooling to 60°, 8 g. of 1-bromo-3-chloropropane was added and the resultant medium was refluxed for 4 hours. The mixture was filtered and the filtrate evaporated to dryness in vacuo. The residue was chromatographed on Florisil (Floridin-Comp.) and the various fractions characterized by thin layer chromatography [Silica gel G, solvent: benzene-ethyl acetate (8:2)]. Elution with ethyl acetate/benzene (1:1) gave 8-chloro-3,5-dihydro-1-(3-chloropropyl)-4,1-benzothiazepin-2(1H)-one. Upon recrystallization from acetone, the product was found to have a melting point of 141–144°.

Example 43

A mixture of 10 g. of 8-chloro-3,5-dihydro-1-(3-chloropropyl) - 4,1 - benzothiazepin - 2(1H) - one, 4.45 g. of sodium iodide and 13.85 g. of N-methylpiperazine in 100 ml. of dioxane was refluxed with stirring for 20 hours. After cooling, the mixture was filtered and the filtrate evaporated to dryness in vacuo. The solid residue was dissolved in dichloromethane. The solution was extracted twice with 2 N hydrochloric acid. The combined aqueous extracts were washed with dichloromethane, made alkaline with 3 N sodium hydroxide and extracted twice with dichloromethane. The organic extracts were combined, washed with water, dried over sodium sulfate and evaporated to dryness yielding 8-chloro-3,5-dihydro-1-[3-(4-methyl - 1 - piperazinyl)propyl] - 4,1 - benzothiazepin-2(1H)-one as a crystalline material. The base was dissolved in 26.4 ml. of 1 N methanolic hydrochloric acid. Treatment with ether yielded crystalline 8 - chloro-3,5 - dihydro - 1 - [3 - (4 - methyl - 1 - piperazinyl)propyl] 4,1 - benzothiazepin-2(1H)-one dihydrochloride, melting point 274–280°.

Example 44

A suspension of 19.4 g. of 8-chloro-3,5-dihydro-4,1-benzothiazepin-2(1H)-one and 4 g. of sodamide in 200 ml. of dioxane was stirred and refluxed for 20 hours. After cooling to 60°, 9.78 g. of 3-(4-methyl-1-piperazinyl) propyl chloride [1] in 30 ml. of dioxane was added over a period of 30 minutes. The mixture was stirred and refluxed for 4 hours. After the addition of 10 ml. of methanol, the mixture was filtered and the filtrate evaporated to dryness in vacuo. The oil remaining was dissolved in ethyl acetate. The resulting solution was extracted twice with 3 N hydrochloric acid. The aqueous extracts were washed with ethyl acetate, made alkaline with 3 N sodium hydroxide and twice extracted with chloroform. The organic extracts were combined, washed with water, dried over sodium sulfate and evaporated to dryness in vacuo yielding 8-chloro - 3,5 - dihydro - 1 - [3 - (4 - methyl - 1 - piperazinyl) propyl]-4,1-benzothiazepin-2(1H)-one as an oil. The oily residue was dissolved in methanol and after adding isopropanolic hydrochloric acid, crystalline 8 - chloro-3,5 - dihydro - 1 - [4 - methyl - 1 - piperazinyl)propyl] 4,1 - benzothiazepin - 2(1H) - one dihydrochloride was obtained of melting point 283–284°.

Example 45

A mixture of 10 g. of 8-chloro-3,5-dihydro-1-(3-chloropropyl) - 4,1 - benzothiazepin - 2(1H) - one and 20 ml. of methylamine in 100 ml. of dioxane was shaken under hydrogen at 5 atmos. and 30° for 2 days. The reaction mixture was diluted with 100 ml. of dichloromethane, washed twice with water and then extracted twice with dilute hydrochloric acid. The extracts were combined, washed with dichloromethane and made alkaline with 6 N sodium hydroxide. Repeated extraction with dichloromethane, washing of the combined organic extracts with water, drying over sodium sulfate and evaporating to dryness in vacuo yielded 8-chloro-1-(3-methylaminopropyl) 3,5 - dihydro - 4,1 - benzothiazepin - 2(1H) - one as an oil. The oily base was dissolved in a mixture of methanol/ether. (1:1) Upon addition of isopropanolic hydrochloric acid, crystalline 8 - chloro - 1 - (3 - methylaminopropyl) 3,5 1 dihydro - 4,1 - benzothiazepin - 2(1H) - one hydrochloride, melting point 229–233° was obtained. The hydrochloride upon recrystallization from methanol/ethyl acetate was found to have a melting point of 230–232°.

Example 46

A suspension of 10 g. of 8-chloro-3,5-dihydro-1(3-chloropropyl)-4,1-benzothiazepin-2(1H)-one, 4.45 g. of sodium iodide and 18 g. of N-β-hydroxyethylpiperazine in 100 ml. dioxane was refluxed with stirring for 20 hours. The mixture was diluted with dichloromethane and washed twice with water. The resulting mixture was extracted twice with 1 N hydrochloric acid. The combined aqueous extracts were washed with dichloromethane, made alkaline with 6 N sodium hydroxide and extracted twice with dichloromethane. The extracts were combined, washed with water, then dried over sodium sulfate and evaporated to dryness yielding 8-chloro-3,5-dihydro-1{3-[4 - (2-hydroxyethyl)-1-piperazinyl]-propyl-}-4,1-benzothiazepin-2(1H)-one as an oil. The oily base was dissolved in methanolic hydrochloric acid and after addition of ether, crystalline 8-chloro-3,5-dihydro-1-{-3[4-(2-hydroxyethyl) - 1-piperazinyl]-propyl-}-4,1-benzothiazepin-2(1H)-one dihydrochloride was obtained of melting points 217–219°. The dihydrochloride upon recrystallization from methanol/ether was found to have a melting point of 216–218°.

---

[1] The 3-(4-methyl-1-piperazinyl)propyl chloride was obtained by reaction of 3-(4-methyl-1-piperazinyl)propanol hydrochloride with thionylchloride, followed by liberation of the free base with sodium methylate.

Example 47

A mixture of 10 g. of 8-chloro-3,5-dihydro-1-(3-chloropropyl)-4,1-benzothiazepin-2(1H)-one, 4.45 g. of sodium iodide and 12 g. of morpholine in 100 ml. of dioxane was refluxed with stirring for 15 hours. After cooling, the mixture was filtered and the filtrate evaporated to dryness. The residue was dissolved in dichloromethane. The solution was extracted twice with 1 N hydrochloric acid. The aqueous extracts were combined and washed with dichloromethane. They were then made alkaline with 6 N sodium hydroxide and extracted twice with dichloromethane. The organic extracts were combined, washed with water, dried over sodium sulfate and evaporated to dryness in vacuo yielding 8-chloro-3,5-dihydro-1-[3-(4-morpholinyl)propyl]-4,1-benzothiazepin-2(1H)-one. The base was dissolved in 1 N methanolic hydrochloric acid and after addition of ether crystalline 8-chloro-3,5-dihydro - 1 - [3-(4-morpholinyl)propyl]-4,1-benzothiazepin-2 (1H)-one hydrochloride was obtained. Upon recrystallization from methanol/ether, the hydrochloride was found to have a M.P. of 246–248°.

Example 48

To a suspension of 5.4 g. of sodamide in 220 ml. of abs. toluene, there was carefully added a suspension of 20 g. of 3,5-dihydro-4,1-benzothiazepin-2(1H)-one in 400 ml. of abs. toluene. On heating to 60°, the stirred mixture became clear and after an additional 30 minutes at this temperature, turned turbid again. After cooling to room temperature, 16 g. of γ-dimethylaminopropyl chloride was added over a period of 20 min. to the stirred mixture. The resultant mixture was refluxed, with stirring for 15 hours and then filtered. The resultant filtrate was extracted twice with dilute hydrochloric acid. The combined aqueous extracts were washed with chloroform, made alkaline with 3 N sodium hydroxide and extracted twice with dichloromethane. The extracts were combined, washed with water, dried over sodium sulfate and evaporated to dryness in vacuo giving a brown oil.

13.8 g. of this oil were chromatographed on a Florisil-column. Elution with chloroform-benzene(1:1), chloroform-methanol (2:8) and methanol gave 1-(3-dimethylaminopropyl) - 3,5 - dihydro-4,1-benzothiazepin-2(1H)-one as an oil which crystallized on standing. [M.P. 61–64° from ether/petroleum ether (30–60°)].

The free base was dissolved in 50 ml. of methanol and by slow addition of 60 ml. of a 5% oxalic acid solution in ether, 1-(3-dimethylaminopropyl)-3,5-dihydro-4,1-benzothiazepin-2(1H)-one oxalate, M.P. 184–187° was obtained. Upon recrystallization from methanol/ether, the oxalate was found to have a melting point of 186–187°.

Example 49

A mixture of 35 g. of 5-methoxy-2-nitrotoluene, 37.1 g. of N-bromosuccinimide and 3.5 g. of dibenzoylperoxide in 350 ml. of carbontetrachloride was refluxed by heating with a 250 w. Infrared lamp (G.E.) for 6 hours. After cooling, the resultant mixture was filtered and the filtrate washed with dilute sodium hydroxide solution and water. It was then dried over sodium sulfate and evaporated to dryness in vacuo. The residue was dissolved in 90 ml. of acetone and the solution carefully added to a stirred solution of 16.9 g. of sodium hydroxide and 24.3 g. of 80% mercapto-acetic acid in 200 ml. water at 0°. The mixture was stirred for 4 days at room temperature, then diluted with water and extracted with dichloromethane. The aqueous medium remaining was made acidic with glacial acetic acid and extracted twice with dichloromethane. The dichloromethane extracts were combined, then washed with water, dried over sodium sulfate and evaporated to dryness in vacuo. The oil remaining was crystallized with ether-petroleum ether (30–60°) giving 2-(5-methoxy-2-nitrobenzylmercapto)acetic acid, M.P. 105–107°. Upon recrystallization from ether, the product was found to have a melting point of 107–109°.

Example 50

A solution of 52.3 g. of 2-(5-methoxy-2-nitrobenzylmercapto)acetic acid in 1,200 ml. of ethanol was hydrogenated at 30° and 6 atmos. with 5 g. of 10% Pd on charcoal until the hydrogen uptake was completed. The mixture was filtered and the filtrate evaporated to dryness in vacuo. To the residue was added 500 ml. of xylene. The resultant mixture was refluxed for 12 hours. From the cooled mixture, a crude crystalline precipitate was obtained of M.P. 196–198°. From the mother liquor, a crude of M.P. 192–196° was isolated. The crudes were combined and dissolved in methanol. Charcoal was added and the resultant mixture refluxed for 3 hours. After filtering the charcoal and distilling off part of the solvent on the steambath, crystalline 3,5-dihydro-7-methoxy-4,1-benzothiazepin-2(1H)-one was obtained. After recrystallization from methanol the product was found to have a melting point of 202–203°.

Example 51

A stirred suspension of 15 g. of 3,5-dihydro-7-methoxy-4,1-benzothiazepin-2(1H)-one in 150 ml. of dimethylformamide was cooled to 0° C. A solution of 4.67 g. of sodium methylate in 23.1 ml. of methanol was added to the so-cooled suspension. After stirring for 15 minutes at 0°, 14 g. of γ-dimethylaminopropyl chloride was added dropwise to the resultant reaction medium. Stirring was continued for 2 hours at 50° and 16 hours at room temperature. After removing most of the solvent in vacuo, the residue was suspended in dichloromethane. The suspension was washed twice with water and extracted twice with 3 N hydrochloric acid. The acidic extracts were combined and washed with ether. They were then made alkaline with 6 N sodium hydroxide and extracted twice with dichloromethane. The combined dichloromethane extracts were washed with water, dried over sodium sulfate and evaporated to dryness in vacuo yielding 1-(3-dimethylaminopropyl)-3,5-dihydro-7-methoxy-4,1-benzothiazepin-2(1H)-one as an oil. The oily residue was dissolved in an excess of 1 N methanolic hydrochloric acid and after addition of ether, 1-(3-dimethylaminopropyl)-3,5-dihydro-7 - methoxy - 4,1-benzothiazepin-2(1H)-one hydrochloride of melting point 199–202° was obtained. Upon recrystallization from methanol ether, the hydrochloride was found to have a melting point of 200–202°.

Example 52

A mixture of 50 g. of 2-chloro-6-nitrotoluene, 52 g. of N-bromosuccinimide and 1 g. of dibenzoylperoxide in 400 ml. of carbontetrachloride was refluxed for 24 hours. After cooling, the resultant mixture was filtered. The filtrate was washed with dilute sodium hydroxide solution and water, dried over sodium sulfate and evaporated to dryness. The residue was dissolved in 100 ml. acetone and carefully added to a stirred solution of 33.3 g. (80%) of mercapto-acetic acid and 23.1 g. of sodium hydroxide in 300 ml. of water at 0°. The mixture was stirred for 3 days at room temperature, then diluted with water, washed twice with chloroform and acidified with glacial acetic acid. Extraction with dichloromethane, washing of the extracts with water, drying over sodium sulfate and evaporating to dryness in vacuo yielded a brown oil. The oil was dissolved in 165 ml. of ethanol and hydrogenated at room temperature at 3 atoms, with 3 g. of 10% Pd on charcoal until the hydrogen uptake was completed. The catalyst was filtered off and the filtrate was evaporated to dryness in vacuo. To the residue, there was added 80 ml. of xylene. The resulting mixture was refluxed for 8 hours. After cooling, crystalline 6-chloro-3,5-dihydro-4,1-benzothiazepin - 2(1H)-one was obtained. Upon recrystallization from acetone, the product was found to have a melting point of 205–206°.

Example 53

A suspension of 9.6 g. of 6-chloro-3,5-dihydro-4,1-benzothiazepin-2(1H)-one and 2.2 g. of sodamide in 100 ml. of dioxane was refluxed with stirring for 20 hours.

After the mixture was cooled to 60°, 6.6 g. of γ-dimethylaminopropyl chloride in 10 ml. of dioxane was carefully added and the refluxing and stirring continued for 4 hours. The mixture was cooled, 5 ml. of methanol added and the solvent was removed in vacuo. The residue was treated with 150 ml. of ethyl acetate and extracted twice wih 2 N hydrochloric acid. The aqueous extracts were washed with ethyl acetate, made alkaline with 3 N sodium hydroxide and extracted twice with dichloromethane. The organic extracts were combined, washed with water, dried over sodium sulfate and evaporated to dryness in vacuo yielding 6-chloro-1-(3-dimethylaminopropyl)-3,5-dihydro-4,1-benzothiazepin-2(1H)-one. The residue was dissolved in an excess of 1 N methanolic hydrochloric acid and after the addition of ether, 6-chloro-1 - (3 - dimethylaminopropyl)-3,5-dihydro-4,1-benzothiazepin - 2(1H) - one of melting point 205–207° was obtained. Upon recrystallization from methanol/ether, the hydrochloride was found to have a melting point of 206–208°.

Example 54

A mixture of 100.8 g. of 4-methoxy-2-nitrotoluene, 106.5 g. of N-bromosuccinimide and 7 g. of dibenzoylperoxide in 1000 ml. of carbontetrachloride was refluxed for 3 hours. After cooling, the mixture was filtered and the filtrate was washed with dilute sodium hydroxide solution and water, dried over sodium sulfate and evaporated to dryness. The residue was dissolved in 240 ml. of acetone and added slowly to a stirred mixture of 70 g. of 80% mercapto-acetic acid and 48.5 g. of sodium hydroxide in 360 ml. of water at 0°. After stirring for 3 days at room temperature, the mixture was diluted with 300 ml. of water. After addition to the mixture of 500 ml. of dichloromethane, a crystalline precipitate was obtained, which was filtered off and dissolved in 400 ml. of water. The aqueous layer of the filtrate was separated and added to this solution. After acidifying with glacial acetic acid and repeated extraction with dichloromethane, the combined organic extracts were washed with water, dried over sodium sulfate and evaporated to dryness in vacuo. The oily residue was crystallized with ether/petroleum ether (30–60°) yielding 2-(4-methoxy-2-nitrobenzylthio)acetic acid, M.P. 75–77°. After two recrystallizations from ether/petroleum ether (30–60°), the product was found to have a melting point of 79–80.5°.

Example 55

A solution of 80 g. of 2-(4-methoxy-2-nitrobenzylthio) acetic acid in 3000 ml. of ethanol was hydrogenated at room temperature with 8 g. of 10% Pd on charcoal at 13 atmos. until the hydrogen uptake was completed. The mixture was then filtered and the filtrate was evaporated to dryness in vacuo. After the addition of 1000 ml. of xylene to the residue, the mixture was refluxed for 10 hours. Upon cooling, the mixture yielded 3,5-dihydro-8-methoxy-4,1-benzothiazepin-2(1H)-one of melting point 198–201°. The product was dissolved in methanol and charcoal was added to the resulting solution. The mixture was refluxed for 3 hours. After removing the charcoal by filtration and cooling the filtrate, the crystalline product precipitated. Upon recrystallization from methanol, the product was found to have a melting point of 202–204°.

Example 56

A stirred suspension of 20.9 g. of 3,5-dihydro-8-methoxy-4,1-benzothiazepin-2(1H)-one and 4.7 g. of sodamide in 200 ml. dioxane was refluxed for 20 hours. After cooling to 60°, 15.2 g. of γ-dimethylaminopropyl chloride was added and refluxing and stirring were continued for 4 hours. The solvent was then removed in vacuo, the residue treated with ethyl acetate and extracted twice with 2 N hydrochloric acid. The combined aqueous extracts were washed with ethyl acetate and made alkaline with 3 N sodium hydroxide. Extraction with dichloromethane, washing of the combined extracts with water, drying over sodium sulfate and evaporating to dryness yielded 1-(3-dimethylaminopropyl)-3,5-dihydro-8-methoxy - 4,1 - benzothiazepin-2(1H)-one as an oil. The oily base was dissolved in an excess of 1 N methanolic hydrochloric acid. The so-formed solution was evaporated to dryness in vacuo and the residue crystallized from methanol/acetone yielding 1-(3-dimethylaminopropyl)-3,5-dihydro-8-methoxy - 4,1-benzothiazepin-2(1H)-one hydrochloride, melting point 179–183°. Upon recrystallization from methanol/ether, the product was found to have a melting point of 205–206°.

Example 57

A mixture of 51.4 g. of 3-chloro-2-nitrotoluene, 52 g. of N-bromosuccinimide and 5 g. of dibenzoylperoxide in 500 ml. of carbontetrachloride was refluxed for 24 hours. The mixture was then refluxed with heat supplied by a 250W-Infrared lamp (G.E.) for another 15 hours. The resultant mixture was filtered and the filtrate washed with dilute sodium hydroxide solution and water. After drying over sodium sulfate and evaporating to dryness, the residue was dissolved in 100 ml. of acetone and added slowly to a stirred mixture of 34.2 g. of 80% mercaptoacetic acid and 24.8 g. of sodium hydroxide in 300 ml. of water at 0°. After stirring for 3 days at room temperature, the mixture was diluted with 500 ml. of water, washed twice with dichloromethane and acidified with glacial acetic acid. Repeated extraction with dichloromethane, washing of the combined organic extracts with water, drying over sodium sulfate and evaporating to dryness in vacuo yielded an oil. The oil was crystallized from ether/petroleum ether (30–60°), yielding 2-(3-chloro-2-nitrobenzylthio)-acetic acid, M.P. 131–134°. Upon two recrystallizations from ether, the product was found to have a melting point of 135–137°.

Example 58

A solution of 17.2 g. of 2-(3-chloro-2-nitrobenzylthio) acetic acid in 165 ml. of ethanol was hydrogenated at room temperature and 3 atmos. with 2 g. of 10% Pd on charcoal until the hydrogen uptake was completed. The mixture was filtered and the filtrate was evaporated to dryness in vacuo. To the residue, there was added 100 ml. of xylene and the resultant mixture was refluxed for 10 hours. After cooling, the crystalline precipitate which formed was filtered and recrystallized from acetone yielding 9 - chloro-3,5-dihydro-4,1-benzothiazepin-2(1H)-one, M.P. 192–193°.

Example 59

A mixture of 24.5 g. of 9-chloro-3,5-dihydro-4,1-benzothiazepin-2(1H)-one and 5.6 g. of sodamide in 250 ml. of dioxane was refluxed with stirring for 40 hours. After cooling to 60°, 16.9 g. of γ-dimethylaminopropyl chloride was added dropwise and refluxing and stirring were continued for 18 hours. The mixture was diluted with 300 ml. of ethyl acetate and twice extracted with 2 N hydrochloric acid. The aqueous extracts were combined, washed with ethyl acetate, made alkaline with 3 N sodium hydroxide and extracted twice with dichloromethane. The combined organic extracts were washed with water, dried over sodium sulfate and evaporated to dryness in vacuo, yielding as the residue 9-chloro-1-(3-dimethylaminopropyl)-3,5-dihydro-4,1-benzothiazepin-2(1H)-one. The residue was dissolved in an excess of 1 N methanolic hydrochloric acid and the solvent removed in vacuo. The residue was crystallized from methanol/ethyl acetate yielding 9-chloro-1-(3-dimethylaminopropyl) - 3,5 - dihydro-4,1-benzothiazepin-2(1H)-one hydrochloride. The hydrochloride was dissolved in methanol, charcoal was added to the resulting medium and the mixture was refluxed for 4 hours. After filtering to remove the charcoal, ethyl acetate was added and the solvent partially evaporated. From the cooled mixture, the hydrochloride was obtained of M.P. 209–211°.

Example 60

A solution of 7 g. of 8-chloro-1-(3-dimethylaminopropyl)-3,5-dihydro - 4,1 - benzothiazepin-2(1H)-one hydrochloride in 280 ml. of methanol containing 1.12 g. of sodium methylate was evaporated to dryness in vacuo. Methylene chloride was added to the residue and after filtering the resultant mixture, the filtrate was evaporated to dryness yielding 8-chloro-1-(3-dimethylaminopropyl)-3,5-dihydro-4,1-benzothiazepin-2(1H)-one. The free base thus obtained was dissolved in 300 ml. of abs. tetrahydrofuran. This solution was carefully added over a period of one hour to an ice-cold suspension of 3.5 g. of lithium aluminum hydride in 350 ml. of abs. tetrahydrofuran. After stirring the mixture for 30 hours at room temperature, a saturated aqueous sodium sulfate solution and some solid sodium sulfate were added. The resultant mixture was filtered and the filtrate was evaporated to dryness in vacuo leaving an oily brown residue. The oily brown residue was chromatographed on Florisil (Florisil-Comp.). With benzene/ethyl acetate (1:1) 8-chloro-1-(3-dimethylaminopropyl) - 1,2,3,5 - tetrahydro-4,1-benzothiazepine was eluted as a yellow oil. The eluate was dissolved in methanol and an excess of a 5% etheral oxalic acid solution was added. Crystalline 8-chloro-1-(3-dimethylaminopropyl) - 1,2,3,5 - tetrahydro-4,1-benzothiazepine oxalate, M.P. 100–125°, was obtained. Recrystallization from methanol/ether yielded the oxalate of M.P. 142–145°.

Example 61

In 64 ml. of methanol containing 1.548 g. of sodium methylate, there was dissolved 10 g. of 8-chloro-1-(2-diethylaminoethyl) - 3,5-dihydro-4,1-benzothiazepin-2(1H)-one hydrochloride. After removal of the solvent in vacuo, the residue was suspended in dichloromethane. The suspension was filtered and the filtrate evaporated to dryness in vacuo. The oily residue was dissolved in 200 ml. of methanol and with cooling and stirring, 60 ml. of 0.5 N sodium periodate solution was added dropwise. The solution was stirred at room temperature for three days. It was then filtered and the solvent removed in vacuo yielding 8 - chloro-1-(2-diethylaminoethyl)-3,5-dihydro-4,1-benzothiazepin-2(1H)-one 4-oxide as an oil. The oily residue was dissolved in methanol and treated with isopropanolic hydrochloric acid. Addition of ether yielded 8-chloro-1-(2-diethylaminoethyl) - 3,5 - dihydro-4,1-benzothiazepin-2(1H)-one 4-oxide hydrochloride of M.P. 216–218°. After recrystallization from methanol/ether, the hydrochloride melted at 219–220°.

Example 62

A solution of 25 g. of 2-amino-5-chlorobenzohydrol, 2.5 ml. of triethylamine and 20 ml. of carbondisulfide in 250 ml. of ethanol was heated to reflux for 18 hours. The mixture was concentrated in vacuo until a crystalline precipitate appeared. On cooling, 6-chloro-1,4-dihydro-4-phenyl-2H-3,1-benzoxazine-2-thione as white needles were obtained which after recrystallization from a mixture of methylene chloride and petroleum ether melted at 197–200°.

Example 63

A solution of 117 g. (0.5 mole) of 2-amino-5-chlorobenzohydrol in a mixture of 800 ml. of ethanol, 100 ml. of water, 100 ml. of carbondisulfide and 48 g. of potassium hydroxide was refluxed for 16 hours. It was then filtered and the filtrate concentrated in vacuo to a volume of ca. 200 ml. The so-concentrated filtrate was poured into 2000 ml. of ice water and acidified with hydrochloric acid to a pH of ca. 4–5. A crystalline precipitate was obtained which on recrystallization from a mixture of methylene chloride and petroleum ether gave 6-chloro-1,4-dihydro-4-phenyl-2H-3,1-benzothiazine-2-thione, as white needles melting at 156–159°.

Example 64

To 60 ml. of an aqueous 30% solution of hydrogen peroxide cooled in an ice bath there was added 20 ml. of 5 N aqueous potassium hydroxide. To this solution was added 45 ml. of ethanol and 7.1 g. of 6-chloro-1,4-dihydro-4-phenyl-2H-3,1-benzothiazine-2-thione. The resultant suspension was stirred fo 18 hours at room temperature and acidified with dilute hydrochloric acid. A solid precipitate which aws collected on a filter. After recrystallization of the precipitate from methanol, there was obtained 6-chloro-1,4-dihydro-4-phenyl-2H-3,1-benzothiazin-2-one as white platelets melting at 209–211°.

Example 65

Distillation of 6-chloro-1,4-dihydro-4-phenyl-2H-3,1-benzoxazine-2-thione in a bulb tube at ca. 0.1 mm. and ca. 200° (bath temperature) gave a white solid, which after recrystallization from a mixture of methylene chloride and ether melted at 209–211°. This compound was found to be 6 - chloro - 1,4 - dihydro - 4 - phenyl - 2H - 3,1 - benzothiazin-2-one.

Example 66

A solution of 67 g. of 6-chloro-1,4-dihydro-4-phenyl-2H-3,1-benzothiazin-2-one and 5 g. of solium hydrosulfite ($Na_2S_2O_4$) in 500 ml. of an aqueous 20% solution of potassium hydroxide wa refluxed for 4 hours. The mixture was cooled, neutralized with acetic acid and extracted with methylene chloride. The organic phase was washed with water, dried and the solvent was removed in vacuo yielding crude α-phenyl-2-amino-5-chloro-benzylmercaptan as an oil.

Example 67

A solution of 44 g. of the crude mercaptan prepared as in Example 66 in 1050 ml. of ether was shaken with 19.9 ml. of chloroacetyl chloride and 225 ml. of 2 N sodium hydroxide. These reagents were added in turns in small portions so that the aqueous phase remained basic. A solid precipitated which was collected on a filter and after recrystallization of the precipitate from a mixture of methylene chloride and ether yielded 7 - chloro - 3,5 - dihydro-5-phenyl-4,1 - benzothiazepin - 2(1H) - one as white needles melting at 221–223°.

Example 68

To a suspension of 2.9 g. of 7-chloro-3,5-dihydro-5-phenyl-4,1-benzothiazepin-2(1H)-one, in 125 ml. of methanol was added an aqueous solution of 2.3 g. of sodium periodate. The mixture was stirred for 3 days at room temperature. A precipitate which formed was collected on a filter. The precipitate was recrystallized from a mixture of methylene chloride and methanol to yield 7-chloro-3,5-dihydro-5-phenyl-4,1-benzothiazepin-2(1H)-one 4-oxide as white needles melting at 255–258°.

Example 69

To a solution of 15 g. of 7-chloro-3,5-dihydro-5-phenyl-4,1 - benzothiazepin - 2(1H) - one in 100 ml. of dimethylformamide, there was added 4.8 g. of a 50% suspension of sodium hydride in mineral oil. The mixture was cooled in an ice bath and 6.3 ml. of methyl iodide was added thereto. The mixture was stirred for 15 min. and poured into ice water. A solid precipitated which was collected on a filter and after recrystallization from a mixture of methylene chloride and ether yielded 7 - chloro - 3,5 - dihydro-1-methyl-5-phenyl-4,1-benzothiazepin-2(1H)-one as white platelets melting at 173–175°.

Example 70

A solution of 2.9 g. of 7-chloro-3,5-dihydro-5-phenyl-4,1-benzothiazepin-2(1H)-one and 0.5 g. of lithium aluminum hydride in 100 ml. of ether was heated to reflux for 18 hours. After addition of 2 ml. of water and 1.6 ml. of 10% sodium hydroxide, the solution was heated to reflux for 1 hour and filtered through sodium sulfate. The solvent was then removed by distillation. The residue was dissolved in methylene chloride. On addition of ethereal hydrogen chloride, a crystalline precipitate was obtained which after recrystallization from a mixture of methylene chloride and ether yielded 7-chloro-1,2,3,5-tetrahydro-5 - phenyl - 4,1 - benzothiazepine hydrochloride as white prisms melting at 217–218°.

Example 71

To a solution of 4 g. of 7-chloro-3,5-dihydro-5-phenyl-4,1-benzothiazepin-2(1H)-one in 30 ml. of dimethylformamide was added 1.28 g. of a 50% suspension of sodium hydride in mineral oil. The mixture was heated to ca. 60°, for 5 minutes, 3.3 g. of dimethylaminopropyl chloride was then added thereto and the temperature was kept at 60° for 2 hours. The mixture was cooled, poured into ice water and extracted with ether. The ether was evaporated yielding 7-chloro-3,5-dihydro-1-(3-dimethylaminopropyl)-5-phenyl-4,1-benzothiazepin-2(1H)-one as an oil. The residual oil was dissolved in n-butyl alcohol. Addition of hydrogen chloride in ether gave crystals of 7 - chloro - 3,5 - dihydro-1-(3-dimethylaminopropyl)-5-phenyl - 4,1 - benzothiazepin - 2-(1H)-one hydrochloride which after recrystallization from a mixture of methylene chloride and ether was found to have a melting point of 249–251°.

Example 72

A solution of 11.3 g. of 7-chloro-3,5-dihydro-5-phenyl-4,1-benzothiazepin-2(1H)-one and 9 ml. of an aqueous 30% solution of hydrogen peroxide in 200 ml. of acetic acid was kept at 100° for 3 hours. The mixture was cooled and poured into water. A solid precipitated which was collected on a filter and after recrystallization from a mixture of methylene chloride and methanol yielded 7 - chloro - 3,5 - dihydro - 5-phenyl-4,1-benzothiazepin-2 (1H)-one 4,4-dioxide as white prisms melting at 286–288°.

Example 73

7 - chloro - 3,5-dihydro-5-phenyl-4,1-benzothiazepin-2 (1H)-one 4,4-dioxide was also obtained by heating a solution of 0.39 of 7 - chloro - 3,5-dihydro-5-phenyl-4,1-benzothiazepin-2(1H)-one 4-oxide and 0.14 ml. of an aqueous 30 percent solution of hydrogen peroxide in 8 ml. of acetic acid on a steam bath for 2 hours and pouring the resultant reaction medium into ice.

Example 74

To a solution of 12 g. of 2-amino-4-chlorobenzophenone in 40 ml. of tetrahydrofuran and 30 ml. of ethanol there was added 2.5 g. of sodium borohydride. The mixture was stirred for 16 hours at room temperature, and poured into water. White crystals of 2-amino-4-chlorobenzohydrol melting at 94–96° were obtained. The 2 - amino - 4 - chloro - benzohydrol so obtained, was added to a solution of 4.8 g. of potassium hydroxide in 10 ml. of water and 80 ml. of ethanol. To this solution, 10 ml. of carbon disulfide was added and the mixture was heated to reflux overnight. Concentration in vacuo, neutralization with acetic acid and extraction with methylene chloride gave 7-chloro-1,4-dihydro-4-phenyl-2H-3,1-benzothiazin-2-thione as yellow crystals melting at 173–177°.

Example 75

An aqueous solution of 9.1 g. of potassium hydroxide was added to 102 ml. of an aqueous 30% solution of hydrogen peroxide cooled in an ice bath. To this mixture was added 11.7 g. of 7-chloro-1,4-dihydro-4-phenyl-2H-3,1-benzothiazin-2-thione and 40 ml. of ethanol. This suspension was stirred for 18 hours at room temperature and acidified with hydrochloric acid. A crystalline precipitate was obtained which still contained starting material and was, therefore, treated again with hydrogen peroxide under the conditions described above. White prisms of 7 - chloro - 1,4 - dihydro-4-phenyl-2H-3,1-benzothiazin-2-one were obtained which after recrystallization from a mixture of methylene chloride and ether melted at 185–187°.

Example 76

A solution of 1 g. of 7-chloro-1,4-dihydro-4-phenyl-2H-3,1-benzothiazin-2-one and 0.1 g. of sodium hydrosulfite ($Na_2S_2O_4$) in 10 ml. of a 20% aqueous solution of potassium hydroxide was heated to reflux for 2½ hours. The mixture was cooled, neutralized with hydrochloric acid and extracted with methylene chloride yielding α-phenyl-2-amino-4-chloro benzyl mercaptan as an oil. The oil was dissolved in 30 ml. of ether and shaken with 0.25 ml. of chloroacetyl chloride and dilute sodium hydroxide. A solid precipitate formed which after recrystallization from a mixture of methylene chloride and ether gave 8 - chloro - 3,5-dihydro-5-phenyl-4,1-benzothiazepin-2(1H)-one as white prisms melting at 234–236°.

Example 77

To a solution of 2.6 g. of 8-chloro-3,5-dihydro-5-phenyl-4,1-benzothiazepin-2(1H)-one in 20 ml. of dimethylformamide was added 0.84 g. of a 50% suspension of sodium hydride in mineral oil and 2.2 g. of dimethylaminopropyl chloride. The mixture was heated to 50–70° for 1¾ hours, cooled and poured into ice water. Extraction with ether gave 8-chloro-3,5-dihydro-1-(3-dimethylaminopropyl)-5-phenyl-4,1-benzothiazepin-2(1H)-one as an oil. The oil was dissolved in n-butanol and treated with ethereal hydrogen chloride. A crystalline material was obtained which after recrystallization from a mixture of methylene chloride and ether gave 8-chloro-3,5-dihydro - 1 - (3-dimethylaminopropyl)-5-phenyl-4,1-benzothiazepin-2(1H)-one hydrochloride as white needles melting at 253–256°.

Example 78

A tablet dosage form was prepared containing the following ingredients—

| Ingredient: | Amount per tablet, mg. |
|---|---|
| 8 - chloro - 1 - (3-dimethylaminopropyl)-3,5-dihydro - 4,1 - benzothiazepin - 2(1H)one hydrochloride | 25.0 |
| Lactose, spray dried | 72.0 |
| Corn starch, U.S.P. | 2.0 |
| Calcium stearate | 1.0 |
| Total weight | 100.0 |

The procedure for preparing the tablet form is as follows: 8 - chloro-1-(3-dimethylaminopropyl-3,5-dihydro-4,1-benzothiazepin-2(1H)-one hydrochloride, lactose, the corn starch, and the calcium stearate were blended in a suitable mixer. The resulting powder was compressed on a heavy duty tablet compressing machine and yielded tablet slugs of about 1″ diameter and ¼″ thickness. The tablet slugs were passed through a suitable comminuting machine and yielded granules of approximately 16 mesh with a minimum of fines. The granulation was recompressed on a tablet compressing machine using a ¼″ standard concave punch to an average tablet weight of 100 mg.

Example 79

A capsule dosage form was prepared containing the following ingredients—

| Ingredient: | Amount per capsule, mg. |
|---|---|
| 8 - chloro-1-(3-dimethylaminopropyl)-3,5-dihydro - 4,1 - benzothiazepin - 2(1H)-one hydrochloride | 25 |
| Lactose | 158 |
| Corn starch | 37 |
| Talc | 5 |
| Total weight | 225 |

The capsule dosage form was compounded as follows: the 8-chloro-1-(3-dimethylaminopropyl)-3,5-dihydro-4,1-benzothiazepin-2(1H)-one hydrochloride was mixed with the lactose and the corn starch in a suitable mixer. The resulting mixture was further blended by passing it through a Fitzpatrick Comminuting Machine with a #1A screen with knives forward. The blended powder was returned to the mixer, the talc added thereto and the resulting blend mixed thoroughly. The blend was then filled into #4 hard shell gelatin capsules on a Parke Davis capsulating machine.

Example 80

A suppository dosage formulation was prepared containing the following ingredients—

| Ingredient: | Per 1.3 gm. suppository, gm. |
|---|---|
| 8 - chloro-1-(3-dimethylaminopropyl)-3,5-dihydro-4,1-benzothiazepin-2(1H)-one hydro chloride | 0.025 |
| Wecobee M[1] | 1.230 |
| Carnauba wax | 0.045 |

[1] E. F. Drew Company, 522 Fifth Avenue, New York, N.Y.

The suppository dosage formulation was prepared by the following technique: the Wecobee M and the carnauba wax were melted in a suitable size glass-lined container, mixed well and cooled to 45° C. 8-chloro-1-(3-dimethylaminopropyl) - 3,5 - dihydro - 4,1-benzothiazepin-2(1H)-one hydrochloride, which had been reduced to a fine powder with no lumps, was added and stirred until completely and uniformly dispersed. The mixture was poured into suppository molds to yield suppositories having an individual weight of 1.3 gms. The suppositories were cooled and removed from the molds. They were then individually wrapped in wax paper for packaging.

Example 81

A parenteral dosage formulation was prepared as follows: 25 mg. of dry 8-chloro-1-(3-dimethylaminopropyl)-3,5-dihydro-4,1-benzothiazepin-2(1H)-one hydrochloride, fiber free, was filled into a 5 cc. ampul using a Diehl Mater electric filler. The ampuls were then sealed and stearilized at 255° F. for 2 hours. Immediately before use, the powder was solubilized with 5 cc. of Water for Injection, U.S.P.

Example 82

A suppository dosage formulation was prepared containing the following ingredients—

| Ingredient: | Amount per 1.3 gm. suppository, gm. |
|---|---|
| 8 - chloro - 1,2,3,5-tetrahydro-4,1-benzothiazepine hydrochloride | 0.100 |
| Wecobee M | 1.160 |
| Carnauba wax | 0.040 |

Melt the Carnauba wax and Wecobee M in a suitable size glass container and cool the mixture to approximately 45° C. Add the active ingredient to the above mix with stirring and stir until completely dispersed. Pour the resulting mixture into suppository molds to form suppositories having a weight of 1.3 gm. each.

Example 83

A parenteral dosage formulation was prepared as follows: 25 mg. of dry 8-chloro-1,2,3,5-tetrahydro-4,1-benzothiazepine hydrochloride, fiber free, was filled into 5 cc. ampuls using a Diehl Mater electric filler. The ampuls were then sealed and sterilized at 255° F. for 2 hours. Immediately before use, the powder was solubilized with 5 cc. of Water for Injection, U.S.P.

Example 84

A tablet formulation was prepared containing the following ingredients—

| Ingredient: | Amount per tablet, mg. |
|---|---|
| 8 - chloro-1,2,3,5-tetrahydro-4,1-benzothiazepine hydrochloride | 25.0 |
| Lactose, spray dried | 72.0 |
| Corn starch, U.S.P. | 2.0 |
| Calcium stearate | 1.0 |
| Total weight | 100.0 |

The active ingredient, the lactose, the corn starch, and the calcium stearate were mixed in a suitable mixer. The resulting blend was compressed on a heavy duty tablet compressing machine to yield tablet slugs of about 1" diameter and ¼" thickness. The tablet slugs were passed through a suitable comminuting machine to yield granules of approximately 16 mesh with a minimum of fines. They were then recompressed on a tablet compressing machine using a ¼" standard concave punch to an average tablet weight of 75 mg.

Example 85

A capsule dosage formulation was prepared containing the following ingredients—

| Ingredient: | Amount per capsule, mg. |
|---|---|
| 8-chloro-1,2,3,5-tetrahydro - 4,1-benzothiazepine hydrochloride | 100 |
| Lactose | 200 |
| Corn starch | 50 |
| Talc | 10 |
| Total weight | 360 |

The active ingredient was mixed with the lactose and the cornstarch in a suitable mixer. The mixture was further blended by passing it through a Fitzpatrick Comminuting Machine with a No. 1A screen with knives forward. The so-blended powder was returned to the mixer and the talc then added. The resultant mixture was blended thoroughly and filled into a No. 3 hard shell gelatin capsule on a Parke Davis capsulating machine.

Example 86

To a solution of 125 g. (0.5 mole) of 4-chloro-2-nitrobenzyl bromide in 200 ml. of acetone, there was carefully added with stirring at 0°, 53 g. (0.5 mole) of thiolactic acid and 40 g. (1 mole) of sodium hydroxide in 300 ml. of water. The so-formed reaction mixture was stirred at room temperature for 24 hours. It was then made alkaline with 2 N sodium hydroxide and extracted with 5×300 ml. of dichloromethane. The alkaline aqueous layer was acidified with acetic acid and extracted with 5×300 ml. of dichloromethane. The last-mentioned dichloromethane extracts were combined, washed with water, dried over anhydrous sodium sulfate and evaporated to dryness giving crude oily 2-(4'-chloro-2'-nitro-benzylmercapto)propionic acid. The last-mentioned acid was dissolved in 1200 ml. of methanol and to the so-formed solution, there was added 20 g. of 10% palladium on carbon catalyst. The suspension was then hydrogenated under 50–140 p.s.i. pressure at room temperature until the theoretical amount of hydrogen was absorbed. The catalyst was removed by filtration, and the filtrate evaporated to dryness. The crystalline residue was recrystallized from ether-hexane (M.P. 107–109°) and then from ether to give 2-(2'-amino-4'-chlorobenzylmercapto)propionic acid, M.P. 105–105.5°.

Example 87

The 2-(2'-amino - 4'-chlorobenzylmercapto)propionic acid obtained in Example 86 was dissolved in 600 ml.

of dry xylene and the resulting solution refluxed for 5 hours with removal of water formed when refluxing. After cooling, the crystalline precipitate was separated by filtration, washed with xylene and dried yielding 8-chloro-3,5-dihydro-3-methyl - 4,1-benzothiazepin-2(1H)-one. After recrystallization from methanol, the melting point of the product was 229–230°.

Example 88

To a solution of 49.8 g. (0.2 mole) of 4-chloro-2-nitro-benzyl bromide in 150 ml. of acetone, there was carefully added at 0° a stirred solution of 24 g. (0.2 mole) of α-mercaptobutyric acid and 16 g. (0.4 mole) of sodium hydroxide in 150 ml. of water. The so-formed reaction mixture was stirred at room temperature for 3 days, then diluted with water and extracted with dichloromethane. The alkaline aqueous layer was acidified with acetic acid and extracted with dichloromethane. The last-mentioned dichloromethane extract was washed with water, dried over anhydrous sodium sulfate and evaporated to dryness yielding crude oily 2-(4'-chloro-2'-nitro-benzylmercapto)-butyric acid. The so-formed acid was dissolved in 600 ml. of methanol, and after addition of 10 g. of a 10% palladium on carbon catalyst, hydrogenated under 50–100 p.s.i. pressure at room temperature until the theoretical amount of hydrogen was absorbed. The catalyst was separated by filtration and the filtrate evaporated to dryness yielding crude 2-(2'-amino-4'-chlorobenzylmercapto)butyric acid.

The crude 2-(2'-amino - 4'-chlorobenzylmercapto)-butyric acid so obtained was dissolved in 1000 ml. of xylene and the solution refluxed for 72 hours with removal of the water formed when refluxing. The resulting reaction medium was filtered and evaporated to dryness. The residue was crystallized from methanol to give 8-chloro-3-ethyl-3,5 - dihydro-4,1-benzothiazepin-2(1H)-one, M.P. 205–208°. After recrystallizing twice from methanol, the product melted at 210–211°.

Example 89

To a solution of 44.8 g. (0.18 mole) of 4-chloro-2-nitro-benzyl bromide in 200 ml. of acetone, there was carefully added at 0° a stirred solution of 24 g. (0.18 mole) of α-mercapto-valeric acid and 14.4 g. (0.36 mole) of sodium hydroxide in 100 ml. of water. The reaction mixture was stirred at room temperature for 3 days, then diluted with water and extracted with dichloromethane. The alkaline aqueous layer was acidified with acetic acid and extracted with dichloromethane. The last-mentioned dichloromethane extract was washed with water, dried over anhydrous sodium sulfate and evaporated to dryness yielding crude oily 2-(4'-chloro-2'-nitro-benzylmercapto)-valeric acid.

The so-formed last-mentioned acid was dissolved in 600 ml. of methanol, and after addition of 10 g. of 10% palladium on carbon catalyst, hydrogenated under 50–100 p.s.i. at room temperature until the theoretical amount of hydrogen was absorbed. The catalyst was removed by filtration, and the filtrate evaporated to dryness leaving crude 2-(2'-amino-4'-chloro-benzylmercapto)-valeric acid.

The so-formed last-mentioned acid was dissolved in 1500 ml. xylene, and the solution refluxed for 48 hours with removal of the water formed when refluxing. The solution was filtered, and evaporated, whereby 8-chloro-3,5-dihydro-3-propyl - 4,1 - benzothiazepin-2(1H)-one, M.P. 163–165° was obtained. Three recrystallizations from methanol raised the melting point to 165–166°.

Example 90

To a solution of 59.7 g. (0.24 mole) of 4-chloro-2 nitro-benzyl bromide in 200 ml. of acetone, there was carefully added at 0°, a stirred solution of 32 g. (0.24 mole) of α-mercapto-isovaleric acid and 19.2 g. (0.48 mole) of sodium hydroxide in 150 ml. of water. The resultant reaction mixture was stirred at room temperature for 3 days, then diluted with water and extracted with dichloromethane. The alkaline aqueous layer was acidified with acetic acid, and evaporated with dichloromethane. The last-mentioned dichloromethane extract was washed with water, dried over anhydrous sodium sulfate and evaporated to dryness whereby crude oily 2-(4'-chloro-2'-nitro-benzylmercapto)-isovaleric acid was obtained.

The so-formed acid was dissolved in 600 ml. of methanol, and after addition of 10 g. of 10% palladium on carbon catalyst, hydrogenated under 50–100 p.s.i. at room temperature until the theoretical amount of hydrogen was absorbed. The catalyst was separated by filtration and the filtrate evaporated to dryness leaving crude 2-(2'-amino-4'-chloro-benzylmercapto)-isovaleric acid.

The crude 2-(2'-amino-4'-chloro-benzylmercapto)isovaleric acid obtained from the above was dissolved in 1000 ml. of xylene and the resultant solution refluxed over a period of 48 hours with removal of the water formed while refluxing. The solution was then filtered and evaporated. The residue was crystallized from ether to give 8-chloro-3,5-dihydro-3-isopropyl-4,1-benzothiazepin-2(1H)-one, M.P. 237–242°. After recrystallizing twice from methanol, the product melted at 239.5–240.5°.

Example 91

To a solution of 32.4 g. (0.13 mole) of 4-chloro-2-nitrobenzyl bromide in 100 ml. of acetone, there was carefully added at 0° a stirred solution of 22 g. (0.13 mole) of α-mercapto-phenylacetic acid and 10.4 g. (0.26 mole) of sodium hydroxide in 100 ml. of water. The so-formed reaction mixture was stirred at room temperature for 3 days, then diluted with water and extracted with dichloromethane. The alkaline aqueous layer was acidified with acetic acid and extracted with dichloromethane. The last-mentioned dichloromethane extract was washed with water, dried over anhydrous sodium sulfate and evaporated to dryness whereby crude oily 2-(4'-chloro-2'-nitro-benzylmercapto)-2-phenylacetic acid was obtained.

The so-obtained last-mentioned crude acid was dissolved in 600 ml. of methanol, and after addition of 10 g. of 10% palladium on carbon catalyst, hydrogenated under 50–100 p.s.i. at room temperature till the theoretical amount of hydrogen was absorbed. The catalyst was removed by filtration and the filtrate evaporated to dryness whereby crude 2-(2'-amino-4'-chloro-benzylmercapto)-2-phenyl-acetic acid was obtained.

The so-obtained last-mentioned crude acid was dissolved in 1200 ml. of xylene, and the solution refluxed 24 hours with removal of the water formed when refluxing. The solution was then filtered, and the filtrate evaporated. The residue was crystallized from methanol yielding 8-cholor-3,5-dihydro-3-phenyl-4,1-benzothiazepin-2(1H)-one, M.P. 262–271°. After recrystallizing twice from methanol, the product melted at 267–269°.

Example 92

To a solution of 22.7 g. (0.1 mole) of 8-chloro-3,5-dihydro-3-methyl-4,1-benzothiazepin-2(1H)-one in 150 ml. of anhydrous dimethylformamide and 150 ml. of anhydrous tetrahydrofuran, there was added 4.3 g. (0.11 mole) of sodamide, and the reaction mixture was stirred for 2 hours at room temperature and one hour at 50°. After cooling to room temperature, 78 g. of 1-bromo-3-chloropropane was added. The resultant mixture was stirred overnight and then diluted with water and extracted with ether. The ether extract was washed with water, dried over anhydrous sodium sulfate and evaporated to dryness. The residue was crystallized from ether to give 8-chloro-1-(3-chloropropyl)-3,5-dihydro-3-methyl-4,1-benzothiazepin-2(1H)-one; M.P. 118–119°, after recrystallization from ethyl acetate.

Example 93

The solutions of 40 ml. of methylamine in 100 ml. of dioxane and 15.2 g. of 8-chloro-1-(3-chloropropyl)-3,5-dihydro-3-methyl-4,1-benzothiazepin-2(1H)-one in 50 ml. of dioxane were combined, and the resultant mixture kept in a nitrogen atmosphere under 50–60 p.s.i. pressure at room temperature. After removal of the excess of methylamine, the reaction mixture was diluted with dichloromethane. After washing with water, it was extracted several times with diluted hydrochloric acid. The acidic extracts were combined and made alkaline with a 6 N sodium hydroxide solution. The resultant mixture was extracted with dichloromethane, and the last-mentioned dichloromethane extract was washed with water and evaporated whereby crude 8-chloro-3,5-dihydro-1-(3-methylaminopropyl) - 3 - methyl - 4,1 - benzothiazepin - 2 (1H)-one was obtained. The crude base was dissolved in methanol, and after acidification with isopropanolic hydrochloric acid and addition of ether, 8-chloro-3,5-dihydro - 1 - (3' - methylaminopropyl) - 3 - methyl - 4,1 - benzothiazepin-2(1H)-one hydrochloride crystallized. After recrystallizing twice from methanol-ether, the hydrochloride melted at 218–220°.

Example 94

A solution of 10 g. of 8-chloro-1-(3-chloropropyl)-3,5-dihydro-3-methyl-4,1-benzothiazepin-2(1H)-one and 4.45 g. of sodium iodide in 300 ml. of absolute ethanol was saturated with dimethylamine at 75° for 5 hours. The resultant mixture was cooled, filtered and the filtrate evaporated to dryness. The oily residue was dissolved in 500 ml. of ethyl acetate, and this solution was extracted with 1 N hydrochloric acid. The acidic extract was washed with ether, then made alkaline with 3 N sodium hydroxide, and extracted with 1000 ml. of ethyl acetate. The last-mentioned ethyl acetate extract was washed with water, dried over anhydrous sodium sulfate and evaporated to dryness, yielding 8-chloro-1-(3-dimethylaminopropyl)-3,5-dihydro-3-methyl-4,1-benzothiazepin-2(1H)-one as an oil. The oily residue was dissolved in isopropanol saturated with hydrogen chloride and evaporated to dryness. Recrystallization from acetone gave 8-chloro-1-(3-dimethylaminopropyl) - 3,5 - dihydro-3-methyl-4,1-benzothiazepin-2(1H)-one hydrochloride, M.P. 190–192°.

Example 95

A mixture of 15.2 g. of 8-chloro-1-(3-chloropropyl)-3,5 - dihydro - 3 - methyl - 4,1-benzothiazepin-2(1H)-one, 7.5 g. of sodium iodine and 23.4 g. of N-methylpiperazine in 150 ml. dioxane was refluxed for 25 hours. After cooling at room temperature, the mixture was filtered and the filtrate evaporated to dryness. The residue was dissolved in dichloromethane, and this solution, after being washed with water, was extracted several times with 2 N hydrochloric acid. The combined acid extracts were made alkaline with 3 N sodium hydroxide solution, and then extracted three times with dichloromethane. The last-mentioned dichloromethane extracts were washed with water, dried over anhydrous sodium sulfate and evaporated to dryness to give a residue containing crude 8-chloro-3,5 - dihydro - 1 - [3-(4-methylpiperazin-1-yl)propyl]-3-methyl-4,1-benbothiazepin-2(1H)-one. To a solution of the last-mentioned residue in methanol, there was added an excess of isopropanolic hydrochloric acid. Upon addition of ether, crystalline 8-chloro-3,5-dihydro-1-[3-(4-methylpiperazin - 1 - yl)propyl]-3-methyl-4,1-benzothiazepin-2(1H)-one dihydrochloride was obtained. After drying in vacuo and several recrystallizations from methanol, the salt melted at 244–246°.

Example 96

A mixture of 15.2 g. of 8-chloro-1-(3-chloropropyl)-3,5 - dihydro - 3 - methyl-4,1-benzothiazepin-2(1H)-one, 7.5 g. of sodium iodide and 26 g. of β-hydroxyethylpiperazine in 150 ml. of dioxane was stirred and refluxed for 24 hours. The reaction mixture was diluted with dichloromethane, and after washing with water, was extracted with 1 N hydrochloric acid several times. The acidic extracts were combined, made alkaline with 6 N sodium hydroxide solution and extracted with dichloromethane. The last-mentioned dichloromethane extract was washed with water, dried over anhydrous sodium sulfate and evaporated to dryness, yielding 8 - chloro - 3,5 - dihydro - 1-{3-[4-(2-hydroxyethyl)piperazinyl]propyl} - 3 - methyl-4,1-benzothiazepin-2(1H)-one as an oil. The oily base was dissolved in 1 N methanolic hydrochloric acid, and after addition of ether, crystalline 8-chloro-3,5-dihydro-1-{3-[4-(hydroxyethyl)piperazinyl]propyl}-3-methyl-4,1-benzothiazepin-2(1H)-one dihydrochloride was collected. After three recrystallizations from methanol, the dihydrochloride had a melting point of 171–174°.

Example 97

A solution of 125 g. (0.5 mole) of 4-chloro-2-nitrobenzyl bromide in 200 ml. of acetone was carefully added to a stirred solution of 53 g. (0.5 mole) of β-mercapto propionic acid and 40 g. (1 mole) of sodium hydroxide in 300 ml. of water. The reaction mixture was stirred at room temperature for 3 days, after which time it was made alkaline with 2 N sodium hydroxide and extracted with 5×300 ml. of dichloromethane. The alkaline aqueous layer was acidified with acetic acid and extracted with 5×300 ml. of dichloromethane. The last-mentioned dichloromethane extract was washed with water, dried over anhydrous sodium sulfate and evaporated to dryness leaving a dark oil. The dark oil on purification with charcoal in methanol solution gave crystalline 3-(4'-chloro-2'-nitrobenzylmercapto)propionic acid (M.P. 87–89° after recrystallization from benzene).

The so-formed last-mentioned acid was dissolved in 1200 ml. of methanol, and after addition of 30 g. of 10% palladium on carbon catalyst, hydrogenated at 185–225 p.s.i. pressure at room temperature until the theoretical amount of hydrogen was absorbed. The catalyst was removed by filtration, and the filtrate evaporated to dryness leaving crude 3-(2'-amino-4'-chlorobenzylmercapto)propionic acid. The so-formed last-mentioned crude catalyst was dissolved in 1000 ml. of anhydrous xylene and the solution refluxed for 24 hours with removal of water formed when refluxing. After evaporation of dryness, the residue was chromatographed on a silica gel column with a benzene-ethyl acetate solvent system, giving crystalline 9 - chloro - 1,3,4,6 - tetrahydro-2H-5,1-benzothiazepin-2-one. After recrystallizing twice from ethyl acetate, the product melted at 215–216°.

Example 98

To a suspension of 2.4 g. (0.01 mole) of 8-chloro-3-ethyl-3,5-dihydro-4,1-benzothiazepin-2(1H)-one in 1500 ml. of anhydrous toluene there was added 21 ml. of 1 N diisobutyl aluminum hydride in toluene. The resultant mixture was refluxed overnight in a nitrogen atmosphere. Shortly after refluxing began, a clear solution was obtained. 10 ml. of 1 N diisobutyl aluminum hydride was then added and the reaction mixture refluxed for 24 hours. An additional 10 ml. of 1 N diisobutyl aluminum hydride was added, and the resultant mixture refluxed for 6 more hours. After cooling in an ice-bath, a mixture of 40 ml. of methanol and 20 ml. of water was added dropwise, and the precipitated salts removed by filtration. The filtrate was dried over anhydrous sodium sulfate and evaporated. The residue was crystallized from methanol to give 8 - chloro - 3 - ethyl-1,2,3,5-tetrahydro-4,1-benzothiazepine, M.P. 207.5–210°.

The hydrochloride was prepared by conventional techniques and was found to have a melting point of 162–166° after two recrystallizations from ethanol.

In a similar manner as described above, utilizing 8-chloro-3-methyl-3,5-dihydro-4,1-benzothiazepin-2(1H)-one as a starting material there was prepared 8-chloro-3-methyl- 1,2,3,5-tetrahydro-4,1-benzothiazepine having a melting point of 73–74° after recrystallization from methanol.

Example 99

To a suspension of 7.6 g. (0.03 mole) of 8-chloro-3,5-dihydro - 3-propyl-4,1-benzothiazepin-2(1H)-one in 1500 ml. of anhydrous toluene there was added 63 ml. of 1 N diisobutyl aluminum hydride in toluene. The resultant mixture was refluxed for 24 hours in a nitrogen atmosphere. Shortly after refluxing began, a clear solution was obtained. After 24 hours, 10 ml. of 1 N diisobutyl aluminum hydride was added and the resultant reaction medium refluxed for 12 more hours. After cooling in an ice-bath, a mixture of 40 ml. of methanol and 20 ml. of water was added dropwise, and the precipitated salts removed by filtration. The filtrate was dried over anhydrous sodium sulfate and evaporated, leaving a crude residue containing 8-chloro-3-propyl-1,2,3,5-tetrahydro - 4,1 - benzothiazepine. The crude residue was dissolved in ethanolic hydrochloric acid, and from this solution on standing there crystallized 8-chloro-3-propyl-1,2,3,5-tetrahydro-4,1-benzothiazepine hydrochloride, M.P. 143–153°. After two recrystallizations from ethanol M.P. 143–145°.

Example 100

To a suspension of 3.1 g. (0.012 mole) of 8-chloro-3,5-dihydro-3-isopropyl - 4,1 - benzothiazepin - 2(1H) - one in 1000 ml. of anhydrous toluene there was added 63 ml. of 1 N diisobutyl aluminum hydride in toluene. The resultant mixture was refluxed in a nitrogen atmosphere for 24 hours. After cooling in an ice-bath, a mixture of 40 ml. of methanol and 20 ml. of water was added dropwise, and the precipitated salts removed by filtration. The filtrate was dried over anhydrous sodium sulfate and evaporated, leaving a crude residue containing 8-chloro-3-isopropyl-1,2,3,5-tetrahydro - 4,1 - benzothiazepine. The crude residue was treated with ethanolic hydrochloric acid, and then evaporated to dryness. Crystallization from ethyl acetate gave 8-chloro-3-isopropyl--1,2,3,5-tetrahydro - 4,1 - benzothiazepine hydrochloride. After two recrystallizations from ethyl acetate the salt melted at 113–115°.

Example 101

To a stirred suspension of 5 g. of lithium aluminum hydride in 600 ml. of anhydrous tetrahydrofuran at 0° there was added dropwise a solution of 9-chloro-1,3,4,6-tetrahydro-2H-5,1-benzothiazocin-2-one in 150 ml. of anhydrous tetrahydrofuran, and the resultant reaction mixture stirred overnight at room temperature. After cooling in an ice-bath, the excess of lithium aluminum hydride was destroyed by dropwise addition of saturated solution of sodium sulfate. The resulting suspension was dried over anhydrous sodium sulfate, filtered and the filtrate evaporated. The starting material was removed by crystallization from methanol. After evaporation, the mother liquors which contained the base were treated with ethanolic hydrochloric acid to give crystalline salt, namely, 9 - chloro - 2,3,4,6 - tetrahydro-1H-5,1-benzothiazocine hydrochloride; M.P. 216–221° after recrystallization from ethanol.

Example 102

To a suspension of 2.56 g. of 8-chloro-3,5-dihydro-3-isopropyl-4,1-benzothiazepin-2(1H)-one in 20 ml. of dimethylformamide stirred at 0° there was added 0.65 g. of sodium methoxide in 2.6 ml. of methanol, while maintaining the temperature at 0° and stirring for an additional 15 minutes. To the resulting mixture 2.44 g. of γ-dimethylaminopropyl chloride was added. The reaction mixture was heated at 50° for two hours, and then left at room temperature overnight. After concentrating the mixture in vacuo, the residue was taken up in dichloromethane, the dichloromethane solution was washed with water, and then extracted with 3 N hydrochloric acid. The acidic layers were combined and washed with ether, made alkaline with 6 N sodium hydroxide solution, and then extracted with dichloromethane. The last-mentioned extract was washed with water, dried over anhydrous sodium sulfate and evaporated to dryness, leaving 8-chloro-1-(3-dimethylaminopropyl)-3,5-dihydro-3 - isopropyl - 4,1-benzothiazepin-2(1H)-one as an oil in vacuo. The oily residue was dissolved in methanol, and after addition of oxalic acid and ether, 8-chloro-1-(3-dimethylaminopropyl)-3,5-dihydro-3-isopropyl-4,1-benzothiazepin - 2(1H)-one oxalate was obtained; M.P. 167–168°. After two recrystallizations from ethanol-ether mixture, the oxalate melted at 167.5–169°.

Example 103

To a suspension of 11.4 g. of 8-chloro-3,5-dihydro-3-methyl-4,1-benzothiazepin-2(1H)-one in 100 ml. of dimethylformamide, there was added at 0° 3.02 g. of sodium methylate in 12.1 ml. of methanol. The temperature was maintained at 0° and the mixture stirred for 15 minutes. 12.4 g. of γ-diethylaminopropyl chloride dissolved in few ml. of toluene, was added to the resultant medium and after heating the so-formed mixture for 2 hours at 50°, it was left overnight at room temperature. The reaction mixture was concentrated in vacuo, and the residue was suspended in dichloromethane. This suspension was washed with water, and extracted twice with 3 N hydrochloric acid. The acidic layers were combined, washed with ether, made alkaline with 6 N sodium hydroxide solution, and extracted with dichloromethane. The last-mentioned dichloromethane extract was washed with water, dried over anhydrous sodium sulfate, and evaporated to dryness, leaving a brown oily residue containing 8-chloro-1-(3-diethylaminopropyl)-3,5-dihydro-3-methyl-4,1-benzothiazepin-2(1H)-one. The oil residue was dissolved in methanol, and after addition of 0.9 g. of oxalic acid and ether, crystalline 8-chloro-1-(3-diethylaminopropyl) - 3,5-dihydro - 3-methyl-4,1-benzothiazepin-2(1H)-one oxalate was obtained. After three recrystallizations from methanolether, the oxalate had a melting point of 150–152°.

Example 104

To a suspension of 11.4 g. (0.05 mole) of 8-chloro-3,5-dihydro-3-methyl-4,1-benzothiazepin-2(1H) - one in 100 ml. of dimethylformamide at 0° was added a solution of 3.02 g. (0.06 mole) of sodium methylate in 12.1 ml. of methanol. A clear solution was obtained which was stirred for 15 minutes. 12.2 g. of γ-dimethylaminopropyl chloride in a few ml. of toluene was then added in portions. The resulting reaction mixture was stirred for 2 hours at 50° and then overnight at room temperature. It was then evaporated to dryness and the residue suspended in dichloromethane. This suspension was washed with water and extracted twice with 3 N hydrochloric acid. The acidic layers were combined, washed with ether, made alkaline with 6 N sodium hydroxide and extracted with dichloromethane. The last-mentioned dichloromethane extract was washed with water, dried over anhydrous sodium sulfate and evaporated to dryness to give 8-chloro-1-(3-dimethylaminopropyl)-3,5-dihydro-3-methyl-4,1-benzothiazepin-2(1H)-one as a brown oil. It was converted to hydrochloride, which after three recrystallizations from methanolether had a M.P. of 187–189°.

Example 105

A mixture of 2.42 g. (0.01 mole) of 8-chloro-3-ethyl-3,5-dihydro-4,1-benzothiazepin-2(1H)-one and 0.487 g. (0.0125 mole) of sodium hydride in 20 ml. of dry dioxane was refluxed with stirring for 20 hours. After cooling to 60°, 1.46 g. of γ-dimethylaminopropyl chloride in 3 ml. of dioxane was carefully added over a period of 10–15 minutes. The reaction mixture was then refluxed for four hours and thereafter filtered. The filtrate was evaporated to dryness. The oily residue was dissolved in ether, and this solution was extracted two times with 3 N hydrochloric acid. The acidic extract was made alkaline with 6 N sodium hydroxide solution and extracted with dichloromethane. The organic extract was dried over anhydrous sodium sulfate and evaporated to dryness yielding 8-chloro - 1 - (3-dimethylaminopropyl)-3-ethyl-3,5-dihydro-4,1-benzothiazepin-2(1H)-one as an oil. The oily residue was dissolved in methanol, and upon addition of isopropanolic hydrochloric acid crystalline 8-chloro-1 - (3-dimethylaminopropyl) - 3-ethyl-3,5-dihydro-4,1-benzothiazepin-2(1H)-one hydrochloride was obtained. After recrystallization from methanol-ether, and drying in vacuum, the hydrochloride melted at 192–194°.

Example 106

To a stirred solution of 2.56 g. (0.01 mole) of 8-chloro-3,5-dihydro-3-propyl-4,1-benzothiazepin-2(1H)-one in 20 ml. of dimethylformamide at 0°, there was added a solution of 0.65 g. (0.012 mole) of sodium methoxide in 2.6 ml. of methanol. The temperature and the stirring was maintained for 15 minutes. There was added to the reaction mixture, 2.44 g. of γ-dimethylaminopropyl chloride. The reaction mixture was heated at 50° for two hours, and then left at room temperature overnight. The reaction mixture was diluted with 100 ml. of dichloromethane, washed twice with water, and extracted with 3 N hydrochloric acid. The acidic extract was washed with ether, made alkaline with 6 N sodium hydroxide, and extracted twice with dichloromethane. The last-mentioned dichloromethane extract was washed with water, dried over anhydrous sodium sulfate and evaporated to dryness yielding a crude residue containing 8-chloro-1-(3-dimethylaminopropyl) - 3,5-dihydro-3-propyl-4,1-benzothiazepin-2(1H)-one. 0.45 g. of the said crude residue was dissolved in methanol, one mole equivalent of oxalic acid was added, and 8-chloro-1-(3-dimethylaminopropyl)-3,5-dihydro-3-propyl-4,1-benzothiazepin-2(1H)-one oxalate precipitated upon addition of ether; M.P. 159–160°. After recrystallization from methanol-ether, the oxalate melted at 162–163.5°.

Example 107

A mixture of 2.56 g. (0.01 mole) of 8-chloro-3,5-dihydro-3-isopropyl-4,1-benzothiazepin - 2(1H) - one and 0.487 g. (0.0125 mole) of sodium hydride in 20 ml. of dioxane was stirred and refluxed for 20 hours. After cooling to 60°, 1.46 g. of γ-dimethylaminopropyl chloride in 30 ml. of dioxane was added carefully over a period of 10–15 minutes. The reaction mixture was refluxed for four hours, filtered and the filtrate evaporated to dryness. The residue was dissolved in ether, and the resultant solution was extracted with 3 N hydrochloric acid. The acidic extract was made alkaline with 6 N sodium hydroxide solution, and then extracted with chloroform. The chloroform extract was washed with water, dried and evaporated. The oily residue remaining was purified by chromatography on a silica-gel column with methanol-benzene (1:1) system. The oily product obtained in this way was converted to an oily hydrochloride when treated with isopropanolic hydrochloric acid and ether. The aqueous solution of this hydrochloride was made alkaline with 6 N sodium hydroxide solution and extracted with chloroform. The chloroform solution was washed with water, dried over anhydrous sodium sulfate and evaporated to dryness. It gave 8-chloro-1(3-dimethylaminopropyl) - 3,5-dihydro-3-isopropyl-4,1-benzothiazepin-2(1H)-one as a colorless oil.

To the solution of the base in methanol was aded 0.18 g. of oxalic acid yielding 8-chloro-1-(3-dimethylaminopropyl)-3,5-dihydro-3 - isopropyl - 4,1 - benzothiazepin-2 (1H) - one oxalate. After two recrystallizations from methanol-ether, and drying at 60° in high vacuum for 24 hours, it melted at 165–169° (decomposition).

Example 108

To a stirred solution of 5.8 g. (0.02 mole) of 8-chloro-3,5-dihydro-3-phenyl - 4,1 - benzothiazepin - 2(1H)-one in 160 ml. of dimethylformamide at 0°, there was added a solution of 1.35 g. (0.025 mole) of sodium methoxide in 61 ml. of methanol. The stirring was continued for 15 minutes while maintaining the temperature at 0°. 4.8 g. of γ-dimethylaminopropyl chloride in 20 ml. of toluene was added and the reaction mixture was heated at 50° for two hours. It was left at room temperature overnight, and then diluted with 200 ml. of dichloromethane. The resulting solution was washed with water and extracted with 3 N hydrochloric acid. The acidic extract was washed with ether, made alkaline with 6 N sodium hydroxide, and extracted twice with dichloromethane. The last-mentioned dichloromethane extract was washed with water, dried over anhydrous sodium sulfate and evaporated to dryness yielding a crude residue containing 8-chloro-1-(3-dimethylaminopropyl) - 3,5-dihydro-3-phenyl - 4,1 - benzothiazepin-2(1H)-one. 0.76 g. of this residue was dissolved in a minimal amount of methanol. To this solution, 0.232 g. of maleic acid was added, upon dilution with ether, crystalline 8-chloro-1-(3-dimethylaminopropyl)-3,5-dihydro-3-phenyl-4,1-benzothiazepin-2(1H) - one maleate was obtained. After recrystallization from methanol-ether, the maleate melted at 159–162°.

Example 109

To a solution of 6.24 g. (0.018 mole) of 8-chloro-3,5-dihydro-1-(3-diethylaminopropyl) - 3 - methyl-4,1-benzothiazepin-2(1H)-one in 1000 ml. of anhydrous toluene, there was added 63 ml. of toluene solution containing 0.054 mole of diisobutyl aluminum hydride. The resulting reaction mixture was refluxed in a nitrogen atmosphere overnight. It was then cooled in an ice-bath. To the so-cooled medium a mixture of 20 ml. of methanol and 10 ml. of water was carefully added, the resultant mixture was filtered and the filtrate was dried over anhydrous sodium sulfate and evaporated yielding a crude containing 8-chloro - 1 - (3-diethylaminopropyl) - 3 - methyl-1,2,3,5-tetrahydro-4,1-benzothiazepine. The crude residue was dissolved in methanol, and after addition of one mole equivalent of oxalic acid, 8-chloro-1-(3-diethylaminopropyl)-3-methyl-1,2,3,5-tetrahydro-4,1 - benzothiazepine oxalate crystallized upon addition of ether. The oxalate melted at 138–139° after two recrystallizations from methanol-ether mixture.

Example 110

To a suspension of 4.9 g. of lithium aluminum hydride in 300 ml. of anhydrous tetrahydrofuran, there was carefully added a solution of 4 g. of 8-chloro-1-(3-dimethylaminopropyl)-3,5 - dihydro-3-methyl-4,1-benzothiazepin-2(1H)-one. The resultant reaction mixture was refluxed 36 hours. An additional amount of 2.5 g. of lithium aluminum hydride was added and the refluxing was continued for an additional 12 hours. After cooling, a saturated solution of sodium sulfate was added slowly to destroy the excess of lithium aluminum hydride. Anhydrous sodium sulfate was added and the resultant mixture filtered. The filtrate was concentrated to dryness leaving a crude residue containing 8-chloro - 1 - (3-dimethylaminopropyl)-3-methyl-1,2,3,5-tetrahydro - 4,1 - benzothiazepine. 1.8 g. of this residue was dissolved in methanol, and after addition of one mole equivalent of oxalic acid, 8-chloro-1-(3-dimethylaminopropyl) - 3 - methyl - 1,2,3,5-tetrahydro-4,1-benzothiazepine oxalate was precipitated by adding ether. After recrystallization from methanol-ether mixture, the oxalate melted at 158.5–160°.

Example 111

To a solution of 4.2 g. (0.014 mole) of 8-chloro-1-(3-dimethylaminopropyl)-3,5-dihydro - 3 - methyl-4,1-benzothiazepin-2(1H)-one in 500 ml. of anhydrous toluene, there was added 42 ml. of 1 N (0.042 mole) diisobutyl aluminum hydride in toluene and the reaction mixture refluxed in a nitrogen atmosphere for 24 hours. After cooling in an ice-bath, a mixture of 10 ml. of methanol and 5 ml. of water was added dropwise to the so-cooled reaction medium. The solution was filtered and the filtrate dried over anhydrous sodium sulfate and evaporated yielding a crude residue containing 8-chloro-1-(3-dimethylaminopropyl) - 1,2,3,5 - dihydro - 3 - methyl - 4,1-benzothiazepine. The residue was dissolved in methanol, and after addition of one mole equivalent of oxalic acid, 8-chloro-1-(3-dimethylaminopropyl) - 3 - methyl-1,2,3,5-tetrahydro-4,1-benzothiazepine oxalate was precipitated by adding ether. After recrystallization from methanol, the oxalate melted at 159.5–160°.

Example 112

To a solution of 4.8 g. (0.015 mole) of 8-chloro-1-(3-dimethylaminopropyl) - 3 - ethyl - 3,5-dihydro-4,1-benzothiazepin-2(1H)-one in 1000 ml. of anhydrous toluene, there was added 45 ml. of 1 N diisobutyl aluminum hydride in toluene. The resulting reaction mixture was refluxed in a nitrogen atmosphere overnight. After cooling, a mixture of 20 ml. of methanol and 10 ml. of water was carefully added. The mixture was then filtered and the filtrate evaporated to dryness leaving a crude residue containing 8 - chloro - 1 - (3 - dimethylaminopropyl)-3-ethyl-1,2,3,5-tetrahydro - 4,1 - benzothiazepine. 4.36 g. of the crude residue was dissolved in methanol, and one mole equivalent of oxalic acid was added to the so-formed solution. 8 - chloro - 1 - (3 - dimethylaminopropyl)-3-ethyl-1,2,3,5-tetrahydro-4,1-benzothiazepine oxalate crystallized upon addition of ether. After two recrystallizations from a mixture of methanol-ether, the oxalate melted at 151–153°.

Example 113

To a solution of 4.1 g. of (0.012 mole) of 8-chloro-1-(3-dimethylaminopropyl) - 3,5 - dihydro - 3 - propyl-4,1-benzothiazepin-2(1H)-one in 1000 ml. of anhydrous toluene, there was added 36 ml. of 1 N diisobutyl aluminum hydride in toluene. The resulting reaction mixture was refluxed overnight. After cooling in an ice-bath, a mixture of 20 ml. of methanol and 10 ml. of water was carefully added and the mixture filtered. The filtrate was dried over anhydrous sodium sulfate and evaporated to dryness yielding a crude residue containing 8-chloro-1-(3-dimethylaminopropyl) - 3 - propyl-1,2,3,5-tetrahydro-4,1-benzothiazepine. 3.42 g. of the crude residue was dissolved in methanol, and after addition of one mole equivalent of oxalic acid, 8-chloro-1-(3-dimethylaminopropyl)-3-propyl-1,2,3,5-tetrahydro - 4,1 - benzothiazepine oxalate crystallized upon addition of ether. After recrystallization from methanol, the oxalate melted at 161–162°.

Example 114

To a solution of 6 g. (0.025 mole) of 8-chloro-1,3-dimethyl-3,5-dihydro - 4,1 - benzothiazepin-2(1H)-one in 1500 ml. of anhydrous toluene was added 60 ml. of 1 N diisobutyl aluminum hydride, and the reaction mixture refluxed overnight in a nitrogen atmosphere. After cooling in an ice-bath, a mixture of 40 ml. of methanol and 20 ml. of water was added dropwise, and the precipitated salts removed by filtration. The filtrate was dried over anhydrous sodium sulfate and evaporated. The residue was dissolved in ethanolic hydrochloric acid, and the addition of ether precipitated 8-chloro-1,3-dimethyl-1,2,3,5-tetrahydro-4,1-benzothiazepine hydrochloride, which after first recrystallization from ethanol-ether melted at 98–105°, and after second at 113–117°.

Example 115

A solution of 4.5 g. of 8-chloro-3,5-dihydro-3-methyl-4,1-benzothiazepin-2(1H)-one and 1.08 g. of sodium methoxide in 750 ml. of methanol was stirred at room temperature for 2 hours, and then evaporated to dryness. To the solution of the residue in 100 ml. of dimethylformamide at 0° was added 7.52 g. of methyl iodine. The reaction mixture was stirred overnight at room temperature, and then evaporated to dryness. The residue was dissolved in dichloromethane and the resulting solution washed with 1 N hydrochloric acid, 1 N sodium hydroxide and water, then dried over anhydrous sodium sulfate and evaporated. Crystalline 8-chloro-1,3-dimethyl-3,5-dihydro-4,1-benzothiazepin-2(1H)-one, was obtained. After recrystallization twice from methanol, the product melted at 132–134.5°.

Example 116

A solution of 6.9 g. of 9-chloro-1,3,4,6-tetrahydro-2H-5,1-benzothiazocin-2-one and 1.64 g. of sodium methoxide in 500 ml. of methanol was stirred at room temperature for two hours. The resulting medium was then evaporated to dryness. To a solution of the residue in 100 ml. of dimethyl formamide at 0° was added 8.5 g. of methyl iodide. The reaction mixture was stirred overnight at room temperature, and then evaporated to dryness. The residue was dissolved in dichloromethane and the resulting solution washed with 1 N hydrochloric acid, 1 N sodium hydroxide and water, then dried over anhydrous sodium sulfate and evaporated. The product was chromatographed on a 400 g. of silica gel column with a 3% ethyl acetate in benzene. Crystalline 9-chloro-1-methyl-1,3,4,6-tetrahydro - 2H - 5,1 - benzothiazocin-2-one was obtained. After two recrystallizations from methanol, the product melted at 99–100°.

Example 117

8-chloro-1,3-dimethyl-3,5-dihydro-4,1 - benzothiazepin-2(1H)-one 4,4-dioxide (M.P. 210–211.5°) from acetone was prepared from the base 8-chloro-1,3-dimethyl-3,5-dihydro-4,1-benzothiazepin-2(1H)-one utilizing the method described in Example 4.

Example 118

To a solution of 3 g. of 9-chloro-1-methyl-1,3,4,6-tetrahydro-2H-5,1-benzothiazocin-2-one in 1000 ml. of toluene was added 40 ml. of 1 N diisobutyl aluminum hydride, and the reaction mixture refluxed overnight in a nitrogen atmosphere. After cooling in an ice-bath a mixture of 40 ml. of methanol and 20 ml. of water was added dropwise, and the precipitated salts removed by filtration. The filtrate was dried over anhydrous sodium sulfate and evaporated yielding 9-chloro-1-methyl-2,3,4,6-tetrahydro-1H-5,1-benzothiazocine. 2.46 g. of residue was converted with ethanolic hydrochloric acid into 9-chloro-1 - methyl-2,3,4,6-tetrahydro-1H-5,1-benzothiazocine hydrochloride, M.P. 158–163° after recrystallization from methanol.

Example 119

In the manner described in Example 108, 9-chloro-1,3,4,6-tetrahydro-2H-5,1-benzothiazocin-2-one was reacted with sodium methoxide and γ-dimethylaminopropylamine to give 9-chloro-1-(3-dimethlaminopropyl)-1,3,4,6-tetrahydro-2H-5,1-benzothiazocin-2-one and the maleate thereof.

Example 120

9 - chloro - 1 - (3-dimethylaminopropyl)-1,3,4,6-tetrahydro-2H-5,1-benzothiazocin-2-one was converted into 9-chloro-1-(3-dimethylaminopropyl) - 2,3,4,6 - tetrahydro-1H-5,1-benzothiazocine and its hydrochloride utilizing diisobutyl aluminum hydride as in Example 118.

Example 121

To a solution of sodium methoxide, prepared by dissolving 0.115 g. of sodium in 75 ml. of methanol, there was added 1.1 g. of 9-chloro-1,3,4,6-tetrahydro-2H-5,1-benzothiazocin-2-one. The resultant mixture was stirred at room temperature for 2 hours. After evaporation to dryness, the residue was taken up in 50 ml. of dimethylformamide. The resultant medium was then cooled to 0° C., and 1.2 g. of γ-dimethylaminopropylchloride was added thereto. The reaction mixture was left at room temperature overnight and then evaporated to dryness. The residue was dissolved in methylene chloride, and this solution was washed several times with water, then dried over sodium sulfate anhydrous, filtrated and the filtrate evaporated to dryness yielding a residue containing 9-chloro-1-(3-dimethylaminopropyl) - 1,3,4,6 - tetrahydro-2H-5,1-benzothiazocin-2-one. The residue was converted to the oxalate, which was recrystallized several times from methanol-ether mixture giving 9-chloro-1-(3-dimethylaminopropyl)-1,3,4,6 - tetrahydro-2H-5,1-benzothiazocin-2-one oxalate, M.P. 165–167°.

Example 122

A parenteral dosage form containing the following ingredients

| Ingredient: | | Per cc. |
|---|---|---|
| 8-chloro-1-(3-dimethylaminopropyl)-3,5-dihydro-3-methyl-4,1-benzothiazepin-2(1H)-one hydrochloride | mg | 5.1 |
| Propylene glycol | cc | 0.4 |
| Benzyl alcohol (Benzaldehyde free) | cc | 0.015 |
| Eethanol U.S.P. | cc | 0.10 |
| Sodium benzoate | mg | 48.8 |
| Benzoic acid | mg | 1.2 |
| Water for injection q.s. | cc | 1.0 | were prepared as follows (10,000 cc.): 51 gm. of 8-chloro-1-(3-dimethylaminopropyl)-3,5 - dihydro-3-methyl-4,1-benzothiazepin-2(1H)-one hydrochloride were dissolved in 150 cc. of benzyl alcohol; 4,000 cc. of propylene glycol and 1,000 cc. of ethanol were added. 12 gm. of benzoic acid were dissolved in the above. 488 gm. of sodium benzoate dissolved in 3,000 cc. of water for injection were added. The solution was brought up to final volume of 10,000 cc. with water for injection. The solution was filtered through an 02 Selas candle, filled into suitable size ampuls, gassed with $N_2$ and sealed. It was then autoclaved at 10 p.s.i. for 30 minutes.

Example 123

A suppository dosage formulation containing the following ingredients

| Ingredient: | Per 1.3 gm. suppository |
|---|---|
| 8-chloro-1-(3-dimethylaminopropyl)-3,5-dihydro-3-methyl-4,1 benzothiazepin-2(1H)-one hydrochloride | 0.025 |
| Wecobee M [1] | 1.230 |
| Carnauba wax | 0.045 |

[1] A synthetic cocoa butter base manufactured by E. F. Drew Company, 522 Fifth Avenue, New York 10, New York.

were prepared as follows: The Wecobee M and Carnauba wax were melted in a suitable size lined container (stainless steel may also be used), mixed well and cooled to 45° C. 8-chloro-1-(3-dimethylaminopropyl)-3,5-dihydro-3-methyl-4,1-benzothiazepin-2(1H) - one hydrochloride, which had been reduced to a fine powder with no lumps, was added and stirred until completely and uniformly dispersed. The mixture was poured into suppository molds to yield suppositories having an individual weight of 1.3 gms. They were cooled and removed from molds. The suppositories were individually wrapped in wax paper for packaging (foil may also be used).

Example 124

A capsule dosage form containing the following ingredients

| Ingredient: | Per capsule, mg. |
|---|---|
| 8-chloro-1-(3-dimethylaminopropyl)-3,5-dihydro-3-methyl-4,1-benzothiazepin-2(1H)-one hydrochloride | 10 |
| Lactose | 173 |
| Corn starch | 37 |
| Talc | 5 |
| Total weight | 225 | were prepared as follows: 8-chloro-1-(3-dimethylaminopropyl)-3,5-dihydro-3-methyl-4,1-benzothiazepin - 2(1H) - one hydrochloride was mixed with the lactose and corn starch in a suitable mixer. The mixture was further blended by passing through a Fitzpatrick Comminuting Machine with a No. 1A screen with knives forward. The blended powder was returned to the mixer, the talc added and blended thoroughly. It was then filled into No. 4 hard shell gelatin capsules on a Parke Davis capsulating machine (any similar type machine will do).

Example 125

A tablet dosage form containing the following ingredients

| Ingredient: | Per tablet mg. |
|---|---|
| 8-chloro-1-(3-dimethylaminopropyl)-3,5-dihydro-3-methyl-4,1-benzothiazepin-2(1H)-one hydrochloride | 25.0 |
| Lactose, spray dried | 72.0 |
| Corn starch, U.S.P. | 2.0 |
| Calcium stearate | 1.0 |
| Total weight | 100.0 | were prepared as follows: 8-chloro-1-(3-dimethylaminopropyl)-3,5-dihydro-3-methyl-4,1-benzothiazepin - 2(1H)-one hydrochloride, lactose, the corn starch and the calcium stearate were blended in a suitable mixer. The powder was compressed on a heavy duty tablet compressing machine and yielded tablet slugs of about 1″ diameter and ¼″ thickness. The tablet slugs were passed through a suitable comminuting machine and yielded granules of approximately 16 mesh with a minium of fines. The granulation was recompressed on a tablet compressing using a ¼″ standard concave punch to an average tablet weight of 100 mg.

Example 126

A parenteral dosage form containing 7-chloro-3,5-dihydro-5-phenyl-4,1-benzothiazepin - 2(1H) - one 4-oxide was prepared as follows:

| | Dry fill ampul 5 cc. |
|---|---|
| 7-chloro-3,5-dihydro-5-phenyl-4,1-benzothiazepin-2(1H)-one 4-oxide mg | 25 |

A parenteral grade of the drug, fiber free, was filled into an ampul using a Diehl Mater electric filler. The ampuls were sealed and sterilized at 255° F. for 2 hours.

Immediately before use, the powder was solubilized with the following solution:

| | Special diluent 2 cc. per ml. |
|---|---|
| Benzyl alcohol, U.S.P. mg | 15.0 |
| Maleic acid mg | 16.0 |
| Propylene glycol mg | 207.0 |
| Sodium hydroxide q.s. to pH | 3.0 |
| Water for Injection q.s. to ml | 1.0 |

The special diluent was prepared as follows: In a suitable container under an atmosphere of nitrogen, the following were dissolved in part of the water for injection in the following order: propylene glycol, benzyl alcohol, and maleic acid. The solution was made to volume, filtered through an 02 Selas candle filter and filled into 2 cc. flint ampuls in an atmosphere of nitrogen. The ampuls were sealed and sterilized at 212° F. for 30 minutes.

Example 127

A capsule dosage form containing the following ingredients.

| Ingredient: | Per capsule, mg. |
|---|---|
| 7 - chloro - 3,5-dihydro-5-phenyl-4,1-benzothiazepin-2(1H)-one 4-oxide | 50 |
| Lactose, U.S.P. | 125 |
| Corn starch, U.S.P. | 30 |
| Talc, U.S.P. | 5 |
| Total weight | 210 | was prepared as follows: 7-chloro-3,5-dihydro-5-phenyl-4,1-benzothiazepin-2(1H)-one 4-oxide was mixed with the lactose and the corn starch in a suitable mixer. The mixture was further blended by passing it through a Fitzpatrick Comminuting Machine with a No. 1A screen with knives forward. The blended powder was then returned to the mixer, the talc added and the resultant mixture blended thoroughly. The mixture was filled into No. 4 hard shell gelatin capsules on a Parke Davis capsulating machine.

Example 128

A tablet dosage form containing the following ingredients

| Ingredient: | Per tablet, mg. |
|---|---|
| 7 - chloro - 3,5-dihydro-5-phenyl-4,1-benzothiazepin-2(1H)-one 4-oxide | 25.00 |
| Lactose, U.S.P. | 64.50 |
| Corn starch | 10.00 |
| Magnesium stearate | 0.50 | was prepared as follows: 7-chloro-3,5-dihydro-5-phenyl-4,1-benzothiazepin-2(1H)-one 4-oxide was mixed with the lactose, corn starch and magnesium stearate in a suitable mixer. The mixture was further blended by passing it through a Fitzpatrick Comminuting Machine fitted with a No. 1A screen with knives forward. The mixed powders were slugged on a tablet compressing machine. The slugs were comminuted to a suitable mesh size (No. 16 screen) and mixed well. The tablets were compressed at a tablet weight of 100 mg. using tablet punches having a diameter of approximately ¼". (Tablets may be either flat or biconvex and may be scored if desired.)

Example 129

A suppository dosage form containing the following ingredients

| Ingredient: | Per 1.3 gm. Suppository, gm. |
|---|---|
| 7 - chloro - 3,5-dihydro-5-phenyl-4,1-benzothiazepin-2(1H)-one 4-oxide | 0.025 |
| Wecobee M[1] | 1.230 |
| Carnauba wax | 0.045 |

[1] A synthetic cocoa butter base manufactured by E. F. Drew Company, 522 Fifth Avenue, New York 10, New York.

was prepared as follows: The Wecobee M and the carnauba wax were melted in a suitable size glass lined container, mixed well and cooled to 45° C. 7-chloro-3,5-dihydro-5-phenyl-4,1-benzothiazepin-2(1H)-one 4 - oxide, which had been reduced to a fine powder with no lumps, was stirred until completely and uniformly dispersed. The mixture was poured into suppository molds to yield suppositories having an individual weight of 1.3 gms. The suppositories were cooled and removed from molds. They were then individually wrapped in wax paper for packaging.

We claim:
1. A compound selected from the group consisting of compounds of the formula

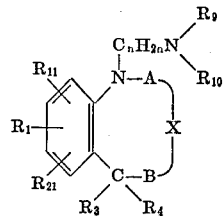

and acid addition salts thereof with pharmaceutically acceptable acids wherein X is selected from the group consisting of

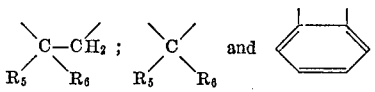

$R_1$, $R_{11}$, and $R_{21}$ are each selected from the group consisting of hydrogen, halogen, lower alkyl and lower alkoxy; $R_3$ is selected from the group consisting of hydrogen and lower alkyl; $R_4$ is selected from the group consisting of hydrogen, lower alkyl and

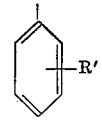

wherein R' is selected from the group consisting of hydrogen and halogen; A is selected from the group consisting of carbonyl and methylene; B is selected from the group consisting of thio, sulfinyl and sulfonyl; $R_5$ is selected from the group consisting of hydrogen, phenyl, lower alkyl and carboxy lower alkyl; $R_6$ is selected from the group consisting of hydrogen, lower alkyl and lower alkanoyloxy, $n$ is a whole integer from 2–7; $R_9$ and $R_{10}$ are selected from the group consisting of, individually, hydrogen, lower alkyl and benzyl; and when taken together with the nitrogen atom, N-lower alkyl-piperazinyl, N-hydroxy-lower alkyl-piperazinyl, pyrrolidinyl, piperazinyl, morpholinyl and piperidyl, at least one of $R_9$ and $R_{10}$ being other than hydrogen.

2. A compound and their acid addition salts as defined in claim 1 wherein $R_{11}$ and $R_{21}$ are both hydrogen, i.e., a compound selected from the group consisting of compounds of the formula

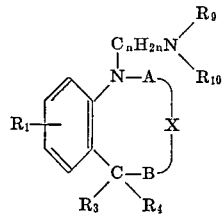

and acid addition salts thereof with pharmaceutically acceptable acids wherein X is selected from the group consisting of

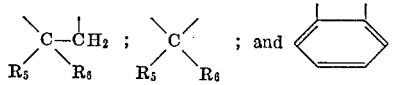

$R_1$ is selected from the group consisting of hydrogen, halogen, lower alkyl and lower alkoxy; $R_3$ is selected from the group consisting of hydrogen and lower alkyl; $R_4$ is selected from the group consisting of hydrogen, lower alkyl and

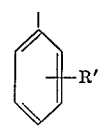

wherein R' is selected from the group consisting of hydrogen and halogen; A is selected from the group consisting of carbonyl and methylene; B is selected from the group consisting of thio, sulfinyl and sulfonyl; $R_5$ is selected from the group consisting of hydrogen, phenyl, lower alkyl and carboxy lower alkyl; $R_6$ is selected from the group consisting of hydrogen, lower alkyl and lower alkanoyloxy, $n$ is a whole integer from 2–7; $R_9$ and $R_{10}$ are selected from the group consisting of, individually, hydrogen, lower alkyl and benzyl; and taken together with the nitrogen atom, N-lower alkyl-piperazinyl, N-hydroxy-lower alkyl-piperazinyl, pyrrolidinyl, piperazinyl, morpholinyl and piperidyl, at least one of $R_9$ and $R_{10}$ being other than hydrogen.

3. A compound as defined in claim 2 and the acid addition salts thereof with pharmaceutically acceptable acids wherein A is carbonyl, B is thio and X is

i.e., a compound selected from the group consisting of compounds of the formula

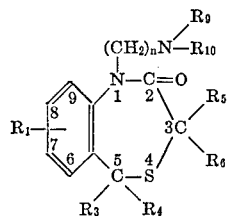

and acid addition salts thereof with pharmaceutically acceptable acids wherein $R_1$ is selected from the group consisting of halogen, hydrogen, lower alkyl and lower alkoxy; $R_3$ and $R_4$ are each selected from the group consisting of hydrogen and lower alkyl; $R_5$ is selected from the group consisting of hydrogen, lower alkyl, phenyl and carboxy lower alkyl; $R_6$ is selected from the group consisting of hydrogen, lower alkyl and lower alkanoyloxy; $n$ is a whole integer from 2–7 and $R_9$ and $R_{10}$ are selected from the group consisting of, individually, hydrogen, lower alkyl and benzyl and taken together with the nitrogen atom, N-lower alkyl piperazinyl, N-hydroxy-lower alkyl-piperazinyl, pyrrolidinyl, piperazinyl, morpholinyl and piperidyl, at least one of $R_9$ and $R_{10}$ being other than hydrogen.

4. A compound as defined in claim 3 wherein $R_3$, $R_4$ and $R_6$ are all hydrogen; $R_5$ is lower alkyl; $R_1$ is halo and is joined to the fused benzo portion at the 8-position thereof and $R_9$ and $R_{10}$ are both lower alkyl, i.e., 8-halo-1-(di-lower alkyl-amino-lower alkyl)-3,5-dihydro-3-lower alkyl-4,1-benzothiazepin-2(1H)-one.

5. A compound as defined in claim 4 wherein $R_1$ is chlorine, $R_5$, $R_9$ and $R_{10}$ are all methyl and $n$ is the integer 3 i.e., 8-chloro-1-(3-dimethylaminopropyl)-3,5-dihydro-3-methyl-4,1-benzothiazepin-2(1H)-one.

6. A compound as defined in claim 3 wherein $R_1$ is halo and is joined at position-8, $R_3$, $R_4$, $R_5$ and $R_6$ are all hydrogen and $R_9$ and $R_{10}$ are lower alkyl, i.e. 8-halo-1-(di-lower alkyl-amino-lower alkyl)-3,5-dihydro-4,1-benzothiazepin-2(1H)-one.

7. A compound as defined in claim 6, wherein $R_1$ is chlorine, $R_9$ and $R_{10}$ are both methyl and $n$ is the integer 3, i.e., 8-chloro-1-(3-dimethyl-aminopropyl)-3,5-dihydro-4,1-benzothiazepin-2(1H)-one.

8. A compound as defined in claim 3 wherein $R_1$ is halogen and is joined at the 8-position, $R_9$ is lower alkyl, $R_{10}$ is hydrogen and $R_3$, $R_4$, $R_5$ and $R_6$ are all hydrogen, i.e., 8-halo-1-(lower alkyl-amino-lower alkyl)-3,5-dihydro-4,1-benzothiazepin-2(1H)-one.

9. A compound as defined in claim 8 wherein $R_1$ is chlorine, $R_9$ is methyl and $n$ is the integer 3, i.e., 8-chloro-1 - (3 - methylaminopropyl) - 3,5 - dihydro - 4,1 - benzothiazepin-2(1H)-one.

10. A compound as defined in claim 3 wherein $R_1$ is halo and is joined at the 8-position; $R_3$, $R_4$, $R_5$ and $R_6$ are all hydrogen; $R_9$ is lower alkyl and $R_{10}$ is benzyl, i.e. 8-halo-3,5-dihydro-1-(N-lower alkyl-N-benzyl-amino-lower alkyl)-4,1-benzothiazepin-2(1H)-one.

11. A compound as defined in claim 3 wherein $R_1$ is lower alkoxy and is joined at position 8; $R_3$, $R_4$, and $R_6$ are all hydrogen; $R_5$ is selected from the group consisting of hydrogen and lower alkyl and $R_9$ and $R_{10}$ are both lower alkyl, i.e., 3-$R_5$-3,5-dihydro-1-(di-lower alkyl-amino-lower alkyl)-8-lower alkoxy-4,1-benzothiazepin-2(1H)-one wherein $R_5$ is selected from the group consisting of hydrogen and lower alkyl.

12. A compound as defined in claim 2 wherein $R_1$ is halo and is joined in position 8; A is methylene; B is thio; X is

wherein $R_5$ is selected from the group consisting of hydrogen and lower alkyl, $R_6$ is hydrogen and $R_9$ and $R_{10}$ are both lower alkyl, i.e., 8 - halo - 3 - $R_5$-1-(di-lower alkyl-amino-lower alkyl)1,2,3,5-tetrahydro-4,1 - benothiazepine wherein $R_5$ is selected from the group consisting of hydrogen and lower alkyl.

13. A compound as defined in claim 2 wherein $R_1$ is halo and is joined in the 8 position; $R_3$ and $R_4$ are both hydrogen; B is sulfinyl; X is

wherein $R_5$ is selected from the group consisting of hydrogen and lower alkyl and $R_6$ is hydrogen, A is carbonyl and $R_9$ and $R_{10}$ are both lower alkyl, i.e., 8-halo-1-(di-lower alkyl amino lower alkyl)-3-$R_5$-3,5-dihydro-4,1-benzothiazepin-2(1H)-one 4-oxide wherein $R_5$ is selected from the group consisting of hydrogen and lower alkyl.

14. A compound as defined in claim 2 wherein $R_3$ and $R_4$ are both hydrogen; B is thio; X is

wherein $R_5$ is selected from the group consisting of hydrogen and lower alkyl and $R_6$ is hydrogen; A is methylene and $R_9$ and $R_{10}$ are both lower alkyl and $R_1$ is joined to the fused phenyl ring in position-8, i.e. 8-$R_1$-1-(di-lower alkyl-amino-lower alkyl) - 3 - $R_5$ - 1,2,3,5 - tetrahydro-4,1-benzothiazepine wherein $R_1$ is selected from the group consisting of hydrogen, halogen, lower alkyl and lower alkoxy and $R_5$ is selected from the group consisting of hydrogen and lower alkyl.

15. A compound as defined in claim 2 wherein $R_3$ and $R_4$ are both hydrogen; B is sulfinyl; X is

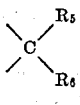

wherein $R_5$ is selected from the group consisting of lower alkyl and hydrogen and $R_6$ is hydrogen and A is carbonyl and $R_9$ and $R_{10}$ are both lower alkyl; i.e., 8-$R_1$-1-(di-lower alkyl-amino-lower alkyl)-3,5-dihydro-3-$R_5$-4,1-benzothiazepin-2(1H)-one 4-oxide wherein $R_1$ is selected from the group consisting of hydrogen, halogen, lower alkyl and lower alkoxy and $R_5$ is selected from the group consisting of hydrogen and lower alkyl.

16. A compound as defined in claim 3 wherein $R_1$ is halo and is joined in the 6-position; $R_3$, $R_4$ and $R_6$ are all hydrogen; $R_5$ is selected from the group consisting of hydrogen and lower alkyl and $R_9$ and $R_{10}$ are both lower alkyl, i.e. 6-halo-1-(di-lower alkyl-amino-lower alkyl)-3, 5-dihydro-3-$R_5$-4,1-benzothiazepin - 2 - (1H)-one wherein $R_5$ is selected from the group consisting of hydrogen and lower alkyl.

17. A compound as defined in claim 3 wherein $R_1$ is halo and is joined in the 9-position; $R_3$, $R_4$, and $R_6$ are all hydrogen; $R_5$ is hydrogen and lower alkyl; and $R_9$ and $R_{10}$ are both lower alkyl, i.e. 9-halo-1-(di-lower alkyl-amino-lower alkyl)-3,5 - dihydro-3-$R_5$-4,1-benzothiazepin-2(1H)-one wherein $R_5$ is selected from the group consisting of hydrogen and lower alkyl.

18. A compound as defined in claim 3, wherein $R_1$ is halo and is joined in the 7-position; $R_3$ is phenyl; $R_4$ and $R_6$ are both hydrogen; $R_5$ is selected from the group consisting of hydrogen and lower alkyl and $R_9$ and $R_{10}$ are both lower alkyl, i.e. 7 - halo - 1 - (di-lower alkyl-amino-lower - alkyl) - 3 - $R_5$ - 5 - phenyl - 3,5-dihydro-4,1-benzothiazepin-2(1H)-one wherein $R_5$ is selected from the group consisting of hydrogen and lower alkyl.

19. A process for preparing a compound as defined in claim 1 which comprises reacting a compound of the formula

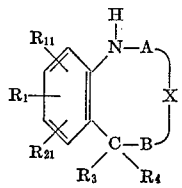

wherein X is selected from the group consisting of

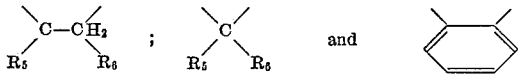

wherein $R_1$, $R_{11}$ and $R_{21}$ are each selected from the group consisting of hydrogen, halogen, lower alkyl and lower alkoxy, $R_3$ is selected from the group consisting of hydrogen and lower alkyl; $R_4$ is selected from the group consisting of hydrogen, lower alkyl and

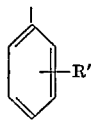

wherein R' is selected from the group consisting of hydrogen and halogen; A is selected from the group consisting of carbonyl and methylene; B is selected from the group consisting of thio, sulfinyl and sulfonyl; $R_5$ is selected from the group consisting of hydrogen, phenyl, lower alkyl and carboxyl lower alkyl; and $R_6$ is selected from the group consisting of hydrogen, lower alkyl and lower alkanoyloxy with a compound of the formula $$W—C_nH_{2n}—W'$$

wherein W and W' are selected from the group consisting of chlorine, bromine and iodine and $n$ is a whole integer from 2–7 and thereafter reacting the so-formed product with a compound of the formula

wherein $R_9$ and $R_{10}$ are selected from the group consisting of, individually, hydrogen, lower alkyl and benzyl and taken together with the nitrogen atom, N-lower alkyl-piperazinyl, N - hydroxy - lower alkyl-piperazinyl pyrrolidinyl, piperazinyl, morpholinyl and piperidyl, at least one of $R_9$ and $R_{10}$ being other than hydrogen.

20. A process as defined in claim 19 wherein A in the first formula therein is carbonyl.

21. A process for preparing a compound as defined in claim 1 which comprises reacting a compound of the formula

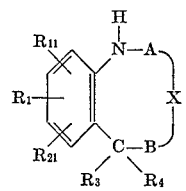

wherein X is selected from the group consisting of

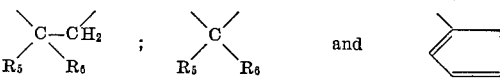

$R_1$, $R_{11}$ and $R_{21}$ are each selected from the group consisting of hydrogen, halogen, lower alkyl and lower alkoxy; $R_3$ is selected from the group consisting of hydrogen and lower alkyl; $R_4$ is selected from the group consisting of hydrogen, lower alkyl and

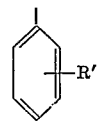

wherein R' is selected from the group consisting of hydrogen and halogen; A is selected from the group consisting of carbonyl and methylene; B is selected from the group consisting of thio, sulfinyl and sulfonyl; $R_5$ is selected from the group consisting of hydrogen, phenyl, lower alkyl and carboxy lower alkyl; and $R_6$ is selected from the group consisting of hydrogen, lower alkyl and lower alkanoyloxy with a compound of the formula

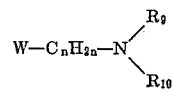

wherein $n$ is a whole integer from 2–7; W is a halogen atom selected from the group consisting of chlorine, bromine and iodine and $R_9$ and $R_{10}$ are selected from the group consisting of, individually, hydrogen, lower alkyl and benzyl; and taken together with the nitrogen atom; N-lower alkyl-piperazinyl, N-hydroxy-lower alkyl-piperazinyl, pyrrolidinyl, piperazinyl, morpholinyl and piperidyl, at least one of $R_9$ and $R_{10}$ being other than hydrogen.

22. A process as defined in claim 21, wherein A in the first formula therein is carbonyl.

References Cited
UNITED STATES PATENTS 3,155,649 11/1964 Krapcho et al. _____ 260—239.3
3,144,439 8/1964 Reeder et al. _____ 260—239

JOHN D. RANDOLPH, *Primary Examiner.*

R. BOND, *Assistant Examiner.*

UNITED STATES PATENT OFFICE
CERTIFICATE OF CORRECTION

Patent No. 3,400,119                      September 3, 1968

Wilhelm Wenner et al.

It is certified that error appears in the above identified patent and that said Letters Patent are hereby corrected as shown below:

Column 3, lines 38 to 40, in the formula $H_2O$ should read line 70, "mercepto" should read -- mercapto --. Column 8, line 2, "choleretic" should read -- choleratic --. Column 13, line 1, "above." should read -- above, --; line 63, "evaported" should read -- evaporated --. Column 14, line 52, "107 - 1110" should read -- 107 - 111° --. Column 15, line 67, "mixiture" should read -- mixture --. Column 21, line 2, "horus" should read -- hours --. Column 22, line 22, after "1-", first occurrence, insert -- [3-( --; same line 22, before "4", cancel the opening bracket; line 69, "points" should read -- point --. Column 28, line 7, "fo" should read -- for --; line 9, "aws" should read -- was --; line 25, "solium" should read -- sodium --; line 27, "wa" should read -- was --. Column 34, line 55, "cholor" should read -- chloro --. Column 36, line 45, "of" should read -- to --. Column 39, line 70, "aded" should read -- added --. Column 42, line 2, "iodine" should read -- iodide --; line 61, "(3-dimethlaminopropyl)" should read -- (3-dimethylaminopropyl) --. Column 43, line 30, "Eethanol" should read -- Ethanol --; line 60, after "size" insert -- glass --. Column 44, line 44, after "compressing" insert -- machine --. Column 49, line 49, "carboxyl" should read -- carboxy --.

Signed and sealed this 25th day of August 1970.

(SEAL)
Attest:

EDWARD M. FLETCHER, JR.                WILLIAM E. SCHUYLER, JR.
Attesting Officer                        Commissioner of Patents